(12) United States Patent
Swinney, II et al.

US009370175B2

(10) Patent No.: US 9,370,175 B2
(45) Date of Patent: Jun. 21, 2016

(54) SPRAYER WITH EASILY LOCATABLE OPERATIONAL CONTROLS, HILL ASSIST, PIVOTAL HOSE REEL, AND AGITATION BOOST

(71) Applicants: Steve A. Swinney, II, Hudson, WI (US); Todd A. Otto, Jordan, MN (US); Bart T. Ellson, Excelsior, MN (US); David J. Martin, Eden Prairie, MN (US); Chakradhari Ratala, Edina, MN (US); Brannon W. Polk, Evansville, IN (US)

(72) Inventors: Steve A. Swinney, II, Hudson, WI (US); Todd A. Otto, Jordan, MN (US); Bart T. Ellson, Excelsior, MN (US); David J. Martin, Eden Prairie, MN (US); Chakradhari Ratala, Edina, MN (US); Brannon W. Polk, Evansville, IN (US)

(73) Assignee: The Toro Company, Bloomington, MN (US)

( * ) Notice: Subject to any disclaimer, the term of this patent is extended or adjusted under 35 U.S.C. 154(b) by 47 days.

(21) Appl. No.: 14/172,250

(22) Filed: Feb. 4, 2014

(65) Prior Publication Data

US 2015/0216118 A1 Aug. 6, 2015

(51) Int. Cl.
| | | |
|---|---|---|
| B05B 1/20 | (2006.01) |
| A01M 7/00 | (2006.01) |
| B05B 15/06 | (2006.01) |
| B05B 15/00 | (2006.01) |
| B05B 9/01 | (2006.01) |
| A01C 23/00 | (2006.01) |

(52) U.S. Cl.
CPC ............ *A01M 7/0042* (2013.01); *A01C 23/008* (2013.01); *A01M 7/005* (2013.01); *A01M 7/0053* (2013.01); *A01M 7/0071* (2013.01); *A01M 7/0082* (2013.01); *B05B 9/01* (2013.01); *B05B 15/002* (2013.01); *B05B 15/064* (2013.01)

(58) Field of Classification Search
CPC . A01M 7/0053; A01M 7/005; A01M 7/0071; A01M 7/0082; A01M 7/0042; A01C 23/008; B05B 15/064; B05B 9/01; B05B 15/002
USPC ......... 239/124, 127, 195–198, 159, 163, 167, 239/172, 142, 525, 526
See application file for complete search history.

(56) References Cited

U.S. PATENT DOCUMENTS

| | | | |
|---|---|---|---|
| 5,286,078 A | 2/1994 | Mottino et al. | |
| 5,741,090 A * | 4/1998 | Dunning et al. ..... | A01C 23/028 239/159 |
| 5,938,282 A | 8/1999 | Epple | |
| 6,234,409 B1 * | 5/2001 | Aslakson ................ | B08B 3/026 239/195 |

(Continued)

FOREIGN PATENT DOCUMENTS

| | | |
|---|---|---|
| EP | 1350669 | 8/2003 |
| FR | 2776968 | 8/1999 |
| WO | 8202176 | 7/1982 |

*Primary Examiner* — Steven J Ganey
(74) *Attorney, Agent, or Firm* — James W. Miller

(57) ABSTRACT

A vehicle mounted sprayer has a plurality of spray booms equipped with downwardly facing spray nozzles. A control console includes a rounded palm rest with the most often used operational spray controls placed directly ahead of the palm rest for easy actuation by the operator as the operator rests the palm of one hand on the palm rest. A pivotal hose reel for manual spraying has pivotal motion about a vertical axis into one of a plurality of adjusted positions relative to the sprayer to ease unwinding and rewinding of the hose from the hose reel. A hill assist system holds the sprayer on a hill for a predetermined time to give the operator enough time to place the sprayer into forward motion up the hill from a standing stop. The spray through the booms can be selectively added to flow in a tank agitation system to boost agitation effectiveness.

18 Claims, 15 Drawing Sheets

(56) References Cited

U.S. PATENT DOCUMENTS

| | | |
|---|---|---|
| 7,762,926 B2 | 7/2010 | Peterson |
| 8,201,897 B2 | 6/2012 | Bell, Jr. et al. |
| 2003/0042760 A1 | 3/2003 | Arthur et al. |
| 2006/0021819 A1 | 2/2006 | Shearer et al. |
| 2009/0223734 A1 | 9/2009 | Frett et al. |
| 2012/0292402 A1* | 11/2012 | Otto et al. ............ A01C 23/008 239/142 |

* cited by examiner

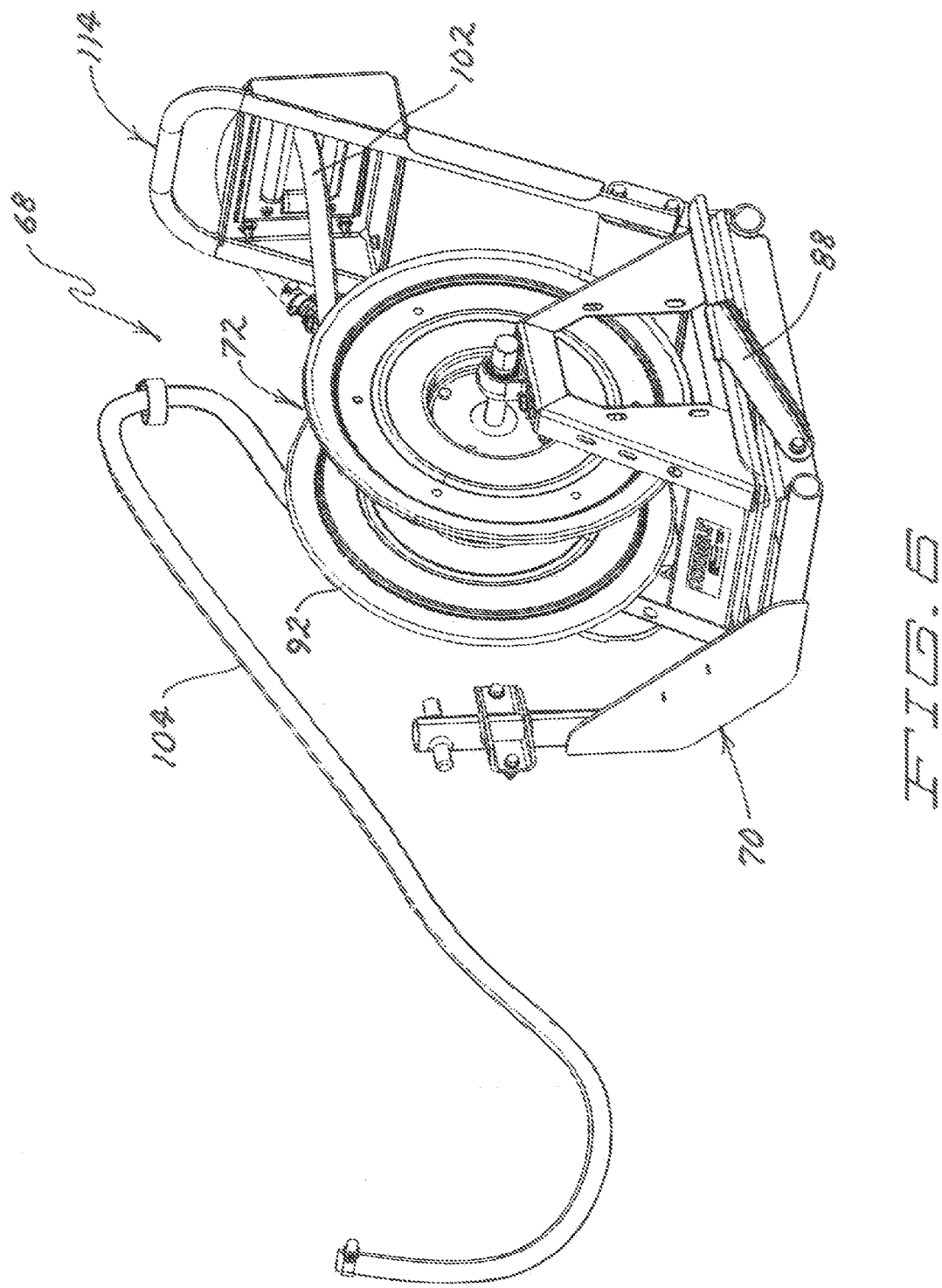

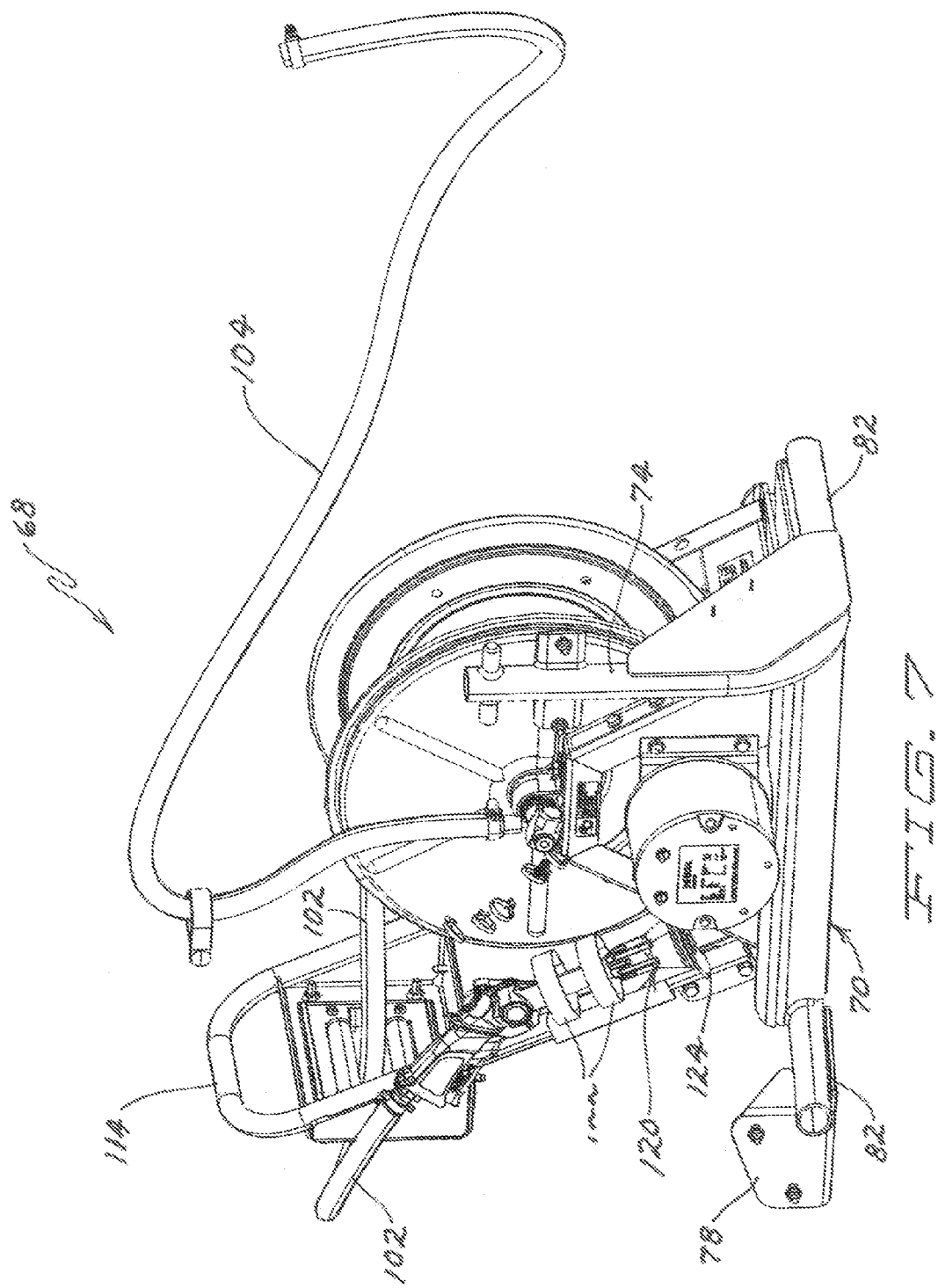

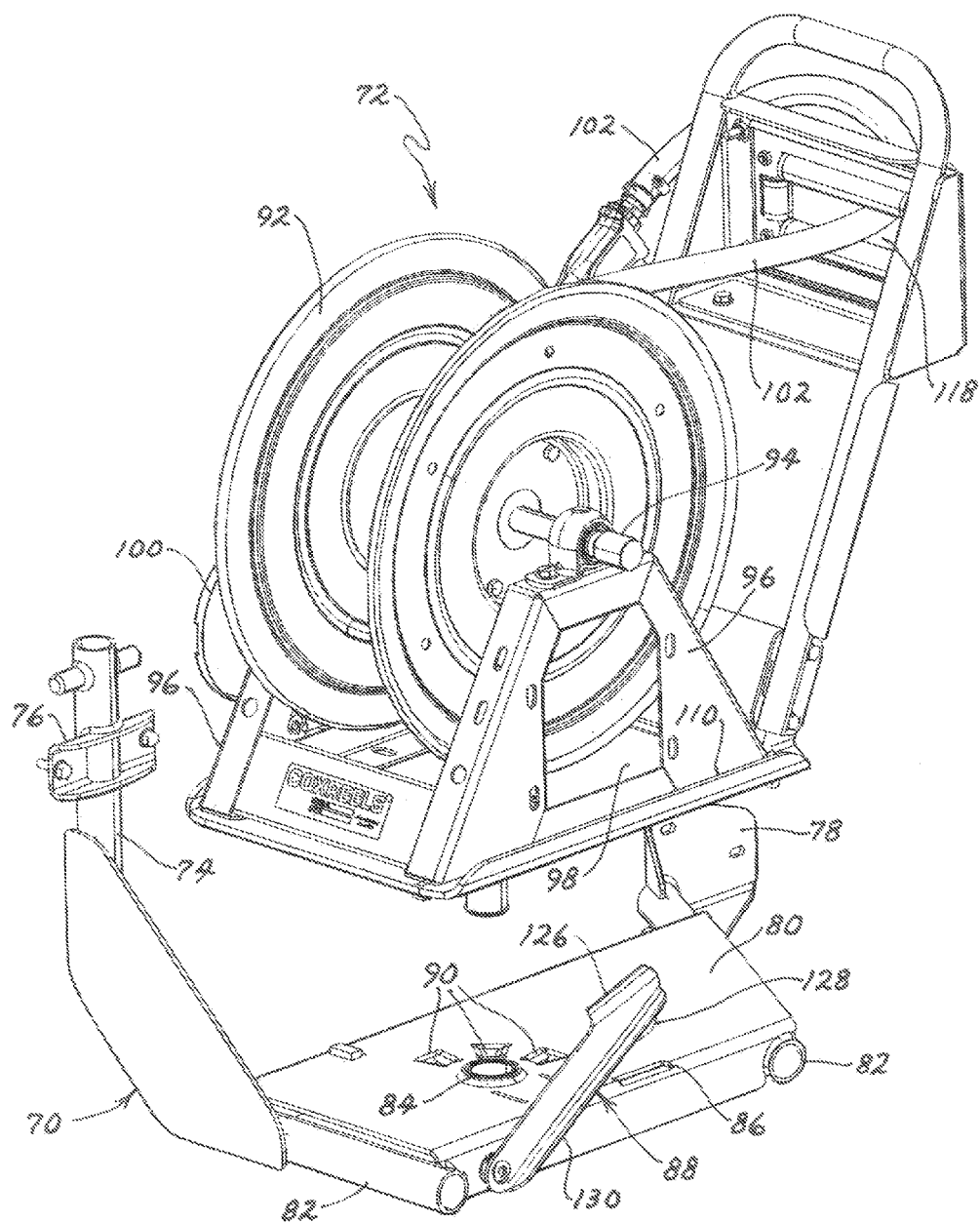

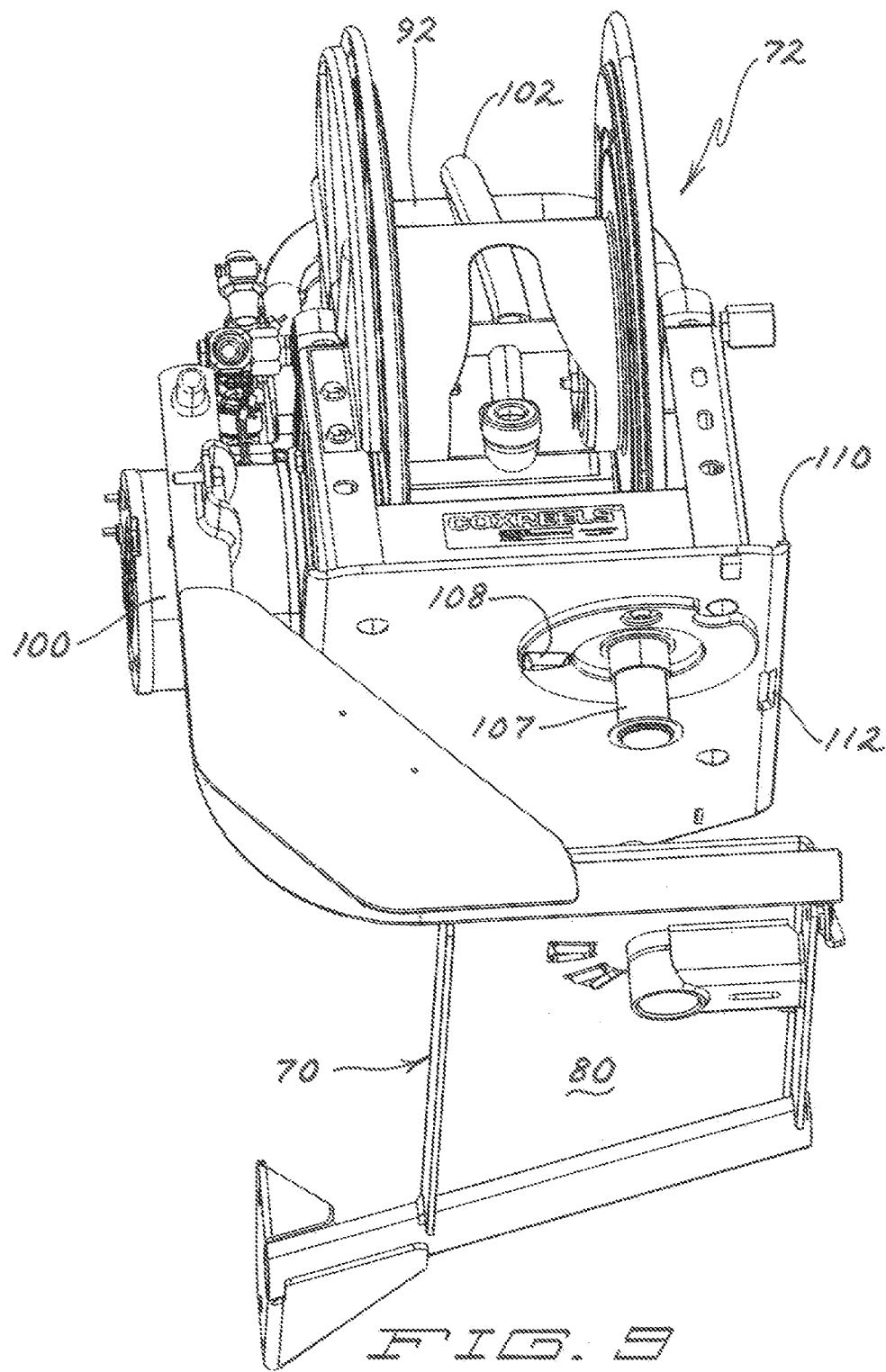

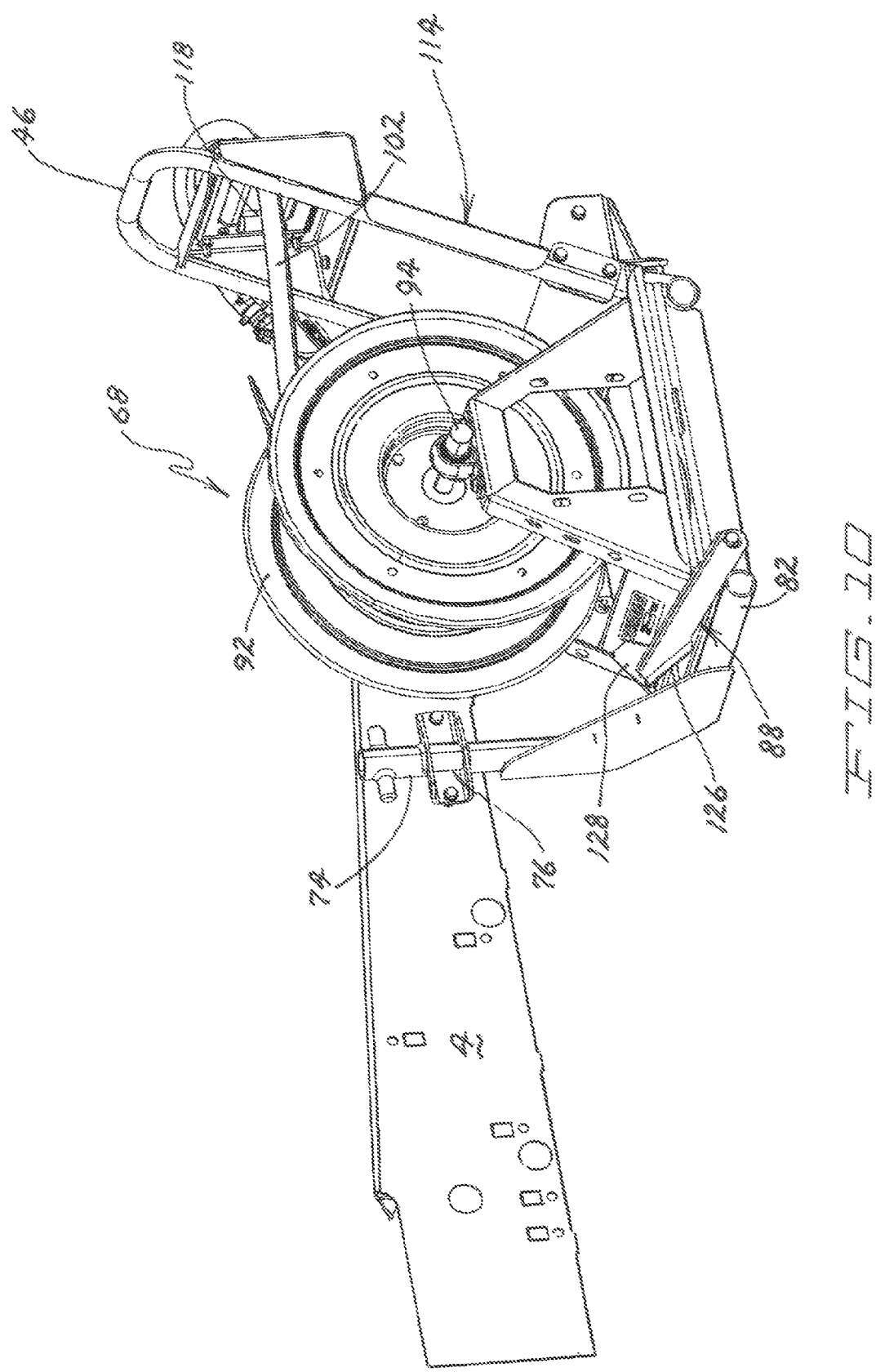

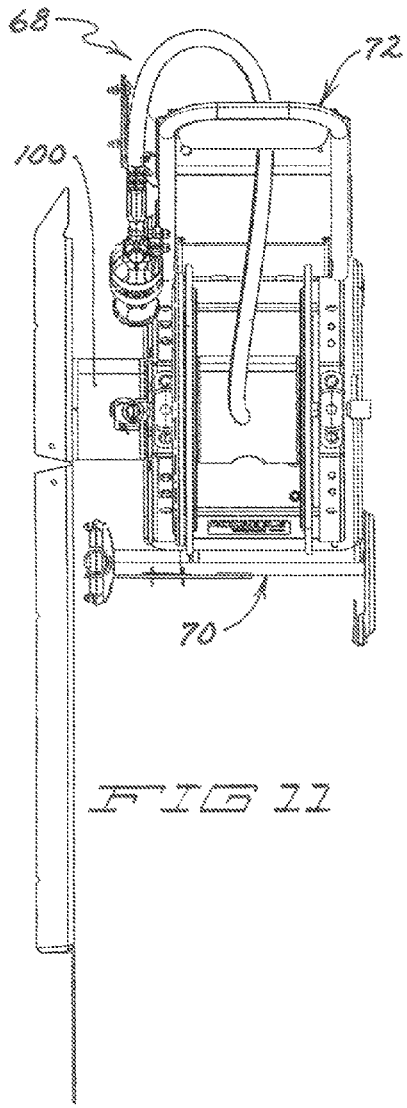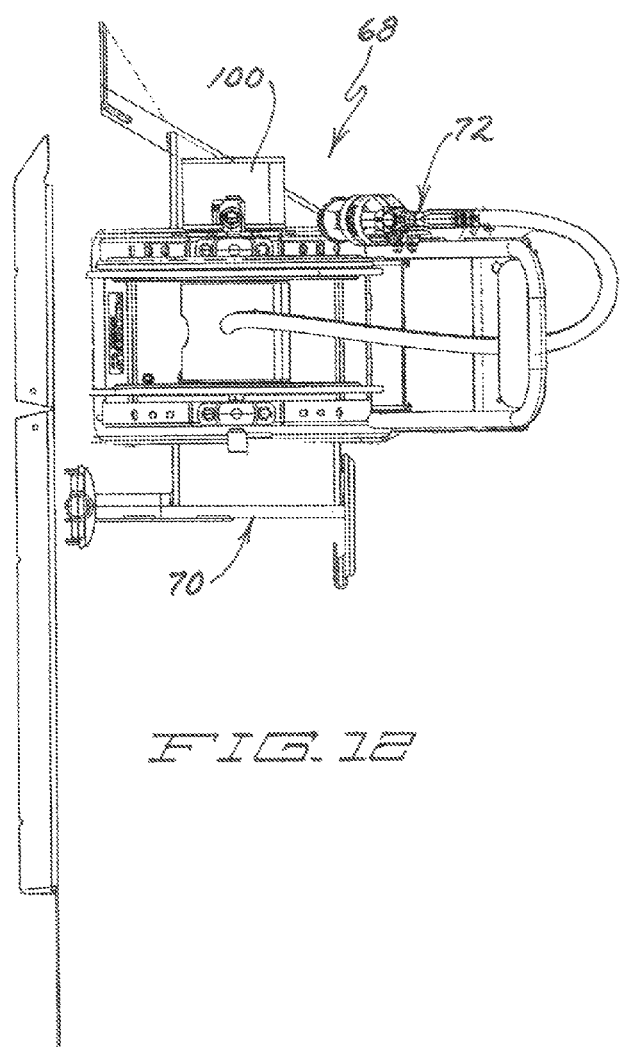

FIG_15

SPRAYER WITH EASILY LOCATABLE OPERATIONAL CONTROLS, HILL ASSIST, PIVOTAL HOSE REEL, AND AGITATION BOOST

TECHNICAL FIELD

This invention relates to vehicle propelled sprayers that travel over a ground or turf surface for spraying a liquid spray solution onto such a surface as the sprayer passes over the surface.

BACKGROUND OF THE INVENTION

Sprayers are well known devices for applying a liquid spray solution of some type to a ground or turf surface. Such sprayers are typically carried on or propelled by a vehicle to allow the sprayer to be driven over a large area of the surface in a relatively short time. In order to further enhance productivity, such sprayers typically have a plurality of side-by-side, laterally extending spray booms that cover a spray swath that is larger than the width of the wheelbase of the sprayer. The outboard wing booms of such a sprayer can usually be folded inwardly to reduce the width of the sprayer for transport when the sprayer is being transported from place to place and is not being used for spraying. U.S. Pat. No. 7,364,096 to Sosnowski et al, which is owned by The Toro Company, the assignee of this invention, discloses a sprayer of this type having a fixed center boom and a pair of wing booms that can be folded into an X-shaped configuration above the center boom for transport.

Sprayers of the type under consideration here include a relatively large tank for holding a supply of the spray solution that is to be applied to the ground or turf surface. The spray solution comprises a relatively small amount of a chemical that is mixed with and suspended in solution in a relatively large amount of water in a desired ratio. One problem is ensuring that the chemical in the spray solution remains in solution with the water as it is stored in the tank prior to being sprayed. An improved tank agitation system for attempting to solve this problem is disclosed in U.S. Pat. No. 8,640,972 to Otto et al., which is also owned by The Toro Company, the assignee of this invention. While this tank agitation system is more effective than predecessor systems, its effectiveness is limited by the amount of flow per unit of time that is available for the tank agitation system. Accordingly, a way to boost the flow through the agitation system when flow is otherwise available for this purpose would be a desirable advance in the art.

Vehicle mounted sprayers with a plurality of spray booms as disclosed in Sosnowski or Otto can be quite heavy due to weight of the spray solution carried thereon, particularly when the spray solution tank is mostly full. It is not uncommon for such a sprayer to be used on hilly terrain such as the hills or undulations often found on modern golf courses. It is also not uncommon for the operator of the sprayer for one reason or another to have to bring the sprayer to a halt while ascending a hill. However, many sprayers of this type use a manually shifted transmission to power the drive wheels of the vehicle. With such a drive system and with the sprayer stopped on a hill, it can be difficult for the operator to smoothly place the sprayer back into forward motion without the vehicle rolling back down the hill somewhat and/or without the vehicle jerking forwardly as the operator moves his or her foot from the brake pedal to the accelerator pedal and attempts to quickly depress the accelerator pedal. It would be a further advantage to provide a sprayer with a hill assist system for allowing the operator to smoothly continue the ascent up a hill from a stopped condition without having the vehicle jerk or roll back down the hill.

In operating a sprayer having multiple spray booms as shown in Sosnowski, separate on/off switches are provided for stopping and starting the spray flow through the fixed center boom and the pivotal wing booms. In addition, lift and lower switches are provided for controlling the actuators that lift the wing booms into their transport positions or lower the wing booms into their spray positions. The Applicants herein have discovered that these boom control switches are the ones most frequently used by the operator during a spraying operation. For example, the operator might have to shut off the spray from all the booms at the end of each pass across a turf surface to avoid applying the spray solution to areas on which the spray solution should not be applied. Or, the operator might have to raise and shut off the spray from one of the wing booms if the sprayer is operating along the margin of the turf surface.

However, in many sprayers, the boom switches, both the on/off and lift and lower switches, can be difficult for the operator to quickly find without having the look down and locate the switches on the control panel provided for such switches. Anytime the operator has to look down to locate controls is problematic as it prevents the operator from keeping his or her full attention on the task of driving the vehicle. This is particularly a problem when the task of locating certain controls to operate such controls arises frequently during the operation of the sprayer, as the Applicants have noted is the case with the boom controls. Thus, a need is present in the sprayer art for some way of assisting the operator in locating and operating the boom controls without needing to look for them.

Finally, on the topic of operator convenience, vehicle mounted sprayers are often equipped with a hose reel for carrying a garden type spray hose for manual spraying by the operator. This is done by the operator stopping the vehicle, dismounting the vehicle, unwinding a length of hose from the hose reel, pointing the hose at an area that is to be manually sprayed, and then engaging a pump and/or valve for causing the spray solution to pass from the tank and through the hose to exit from a nozzle on the end of the hose. However, in known sprayers, the hose reel is mounted on the vehicle in a single position in which the hose reel generally lies flat against one side of the vehicle. The direction in which the hose can be easily wound and unwound from the hose reel, i.e. a longitudinal fore-and-aft direction parallel to the side of the vehicle, often does not comport with where the operator wishes the spray from the hose to be directed. Thus, after a suitable length of hose has been unwound from the hose reel, the operator must often wrestle or drag the hose along the ground to properly orient the hose towards the area or patch of ground that is to be sprayed. This can be difficult and cumbersome to do.

SUMMARY OF THE INVENTION

One aspect of this invention relates to a sprayer for applying a liquid spray solution to a ground or turf surface. The sprayer comprises a frame that is movable over the ground or turf surface. The frame has an operator's compartment thereon for carrying an operator. A tank is carried by the frame for holding the liquid spray solution. A spray system is carried by the frame for withdrawing the liquid spray solution from the tank and for spraying the liquid spray solution downwardly onto the ground or turf surface. The spray system comprises a plurality of laterally extending spray booms carried on the frame with the spray booms collectively covering a spray swath that is larger than a lateral wheelbase of the frame, and a plurality of downwardly facing spray nozzles carried on each of the spray booms for spraying the liquid spray solution downwardly onto the ground or turf surface. A control console is located in the operator's compartment for controlling the spray of the liquid spray solution from the spray booms. The control console comprises a rounded palm rest that is sufficiently curved to permit the operator to rest a palm of his or her hand against a rear side of the palm rest with the operator's hand curling up and over the palm rest such that fingers of the operator's hand at least partially overlie a front side of the palm rest. The control console also includes a plurality of on/off boom switches equal in number to the number of the spray booms for individually stopping and starting spraying of the liquid spray solution from the spray booms. The boom switches are positioned on the control console such that the fingers of the operator's hand are immediately proximate to the boom switches as the operator's hand grips the palm rest with the palm of the operator's hand engaging against the rear side of the palm rest.

Another aspect of this invention relates to a sprayer for applying a liquid spray solution to a ground or turf surface. The sprayer comprises a frame that is movable over the ground or turf surface. A tank is carried by the frame for holding the liquid spray solution. A spray system is carried by the frame for withdrawing the liquid spray solution from the tank and for spraying the liquid spray solution downwardly onto the ground or turf surface. The spray system comprises at least one laterally extending spray boom carried on the frame and a plurality of downwardly facing spray nozzles carried on the at least one spray boom for spraying the liquid spray solution downwardly onto the ground or turf surface. A hose reel assembly is mounted to one side of the frame and capable of selectively receiving liquid spray solution from the spray system during a manual spraying operation. The hose reel assembly comprises a fixed base on one side of the frame and a hose reel carrying a length of hose that may be unwound from a rotatable drum of the hose reel for use in a manual spraying operation and that may be rewound on the drum of the hose reel at a conclusion of the manual spraying operation. The hose reel is pivotally carried atop the base for pivotal movement about a substantially vertical pivot axis to allow the hose reel to be disposed by an operator substantially against and parallel to the one side of the frame in a first adjusted position thereof and to allow the hose reel to be swung by the operator away from the one side of the frame into at least one additional adjusted position thereof in which the hose reel is angled away from the one side of the frame to provide the drum with a plurality of adjusted positions that can be selected depending upon which direction the hose is most desirably oriented in for a particular manual spraying operation.

Yet another aspect of this invention relates to a sprayer for applying a liquid spray solution to a ground or turf surface. The sprayer comprises a self-propelled frame having a plurality of ground engaging wheels for supporting the frame for movement over the ground or turf surface. The frame has an operator's compartment thereon for carrying an operator, a traction drive system including a manual shift transmission for powering a plurality of the ground engaging wheels on the frame, a service brake system having at least one service brake for at least one of the ground engaging wheels to slow and stop the movement of the frame, and clutch, brake and accelerator pedals for use by the operator in controlling the traction drive system and the service brake system. A tank is carried by the frame for holding the liquid spray solution. A spray system is carried by the frame for withdrawing the liquid spray solution from the tank and for spraying the liquid spray solution downwardly onto the ground or turf surface. A hill assist system is provided to allow the operator to reestablish forward motion up a hill from a standing stop of the frame on the hill. The hill assist system comprises a sensor in the service brake system that changes state when a braking effort in the service brake system reaches a predetermined threshold level. A controller is operatively connected to the service brake system sensor, operatively connected to the service brake system, and operatively connected to sensors indicating whether or not the clutch or brake pedals are in home positions comprising non-depressed states of the pedals. The controller upon receiving a signal from the service brake system sensor that the threshold level of braking effort has been reached locks in the braking effort to at least one service brake and maintains the locked in braking effort to the at least one service brake for as long as the clutch and brake pedals remain out of their home positions. Further, the controller upon detecting that the brake pedal has been returned to its home position while the clutch pedal remains out of its home position continues to hold the locked in braking effort for a predetermined hold time to allow the operator to shift his or her foot from the brake pedal to the accelerator pedal to reestablish forward motion up the hill from the standing stop. Finally, the controller has a timer that counts down through the hold time and then releases at the expiration of the hold time the locked in braking effort to the at least one service brake.

An additional aspect of this invention relates to a sprayer for applying a liquid spray solution to a ground or turf surface. The sprayer comprises a frame that is movable over the ground or turf surface. A tank is carried by the frame for holding the liquid spray solution. A spray system is carried by the frame for withdrawing the liquid spray solution from the tank and for spraying the liquid spray solution downwardly onto the ground or turf surface through a plurality of downwardly facing spray nozzles. An agitation system is carried by the frame for agitating the liquid spray solution within the tank through a plurality of inwardly facing agitation nozzles that are distributed on the tank at spaced locations. A master spray valve is provided in the spray system. The master spray valve is normally open to permit flow of the liquid spray solution withdrawn from the tank by a pump to flow through the spray nozzles in the spray system with a portion of such pump flow being diverted prior to going to the master spray valve to an agitation valve in the agitation system when the agitation valve is in an open condition. The master spray valve is operatively connected to a master spray switch to allow the master spray valve to be selectively shut off by the operator to stop the pump flow passing through the master spray valve from reaching the spray system with at least a portion of the stopped pump flow being added to the flow through the agitation valve to boost the effectiveness of the agitation system.

BRIEF DESCRIPTION OF THE DRAWINGS

This invention will be described more completely in the following Detailed Description, when taken in conjunction with the following drawings, in which like reference numerals refer to like elements throughout.

FIG. 6 is a perspective view of a hose reel assembly that is optionally mounted on the sprayer of FIG. 1, particularly illustrating an exterior side of the hose reel assembly;

FIG. 7 is a perspective view similar to FIG. 6 of the hose reel assembly, particularly illustrating an interior side of the hose reel assembly;

FIG. 8 is an exploded perspective view from above of the hose reel assembly of FIG. 6, particularly illustrating the pivotal hose reel separated from the fixed base thereof to show the vertical pivot therebetween, a plurality of position retaining detents on the fixed base for cooperating with the hose reel to hold the hose reel in one of a plurality of adjusted positions, and a pivotal latch on the fixed base for positively locking the hose reel in one of the adjusted positions provided by the detents;

FIG. 9 is an exploded perspective view similar to FIG. 8 but from below the hose reel assembly, particularly illustrating the underside of the hose reel to show a tab on the hose reel that cooperates with the detents on the fixed base as well as a slot on the hose reel for reception of a locking finger on the pivotal latch;

FIG. 10 is a perspective view similar to FIG. 6 of the hose reel assembly of FIG. 6, particularly illustrating the hose reel assembly attached to a side frame member of the vehicle with the pivotal latch in an unlocked position;

FIGS. 11 and 12 are top plan views of the hose reel assembly of FIG. 6, with FIG. 11 particularly illustrating the hose reel in a first adjusted position in which the hose reel is fully inboard and parallel to the side frame member of the vehicle and FIG. 12 particularly illustrating a second adjusted position in which the hose reel is fully outboard and perpendicular to the side frame member of the vehicle;

DETAILED DESCRIPTION

Overview of the Sprayer

Figure 1:
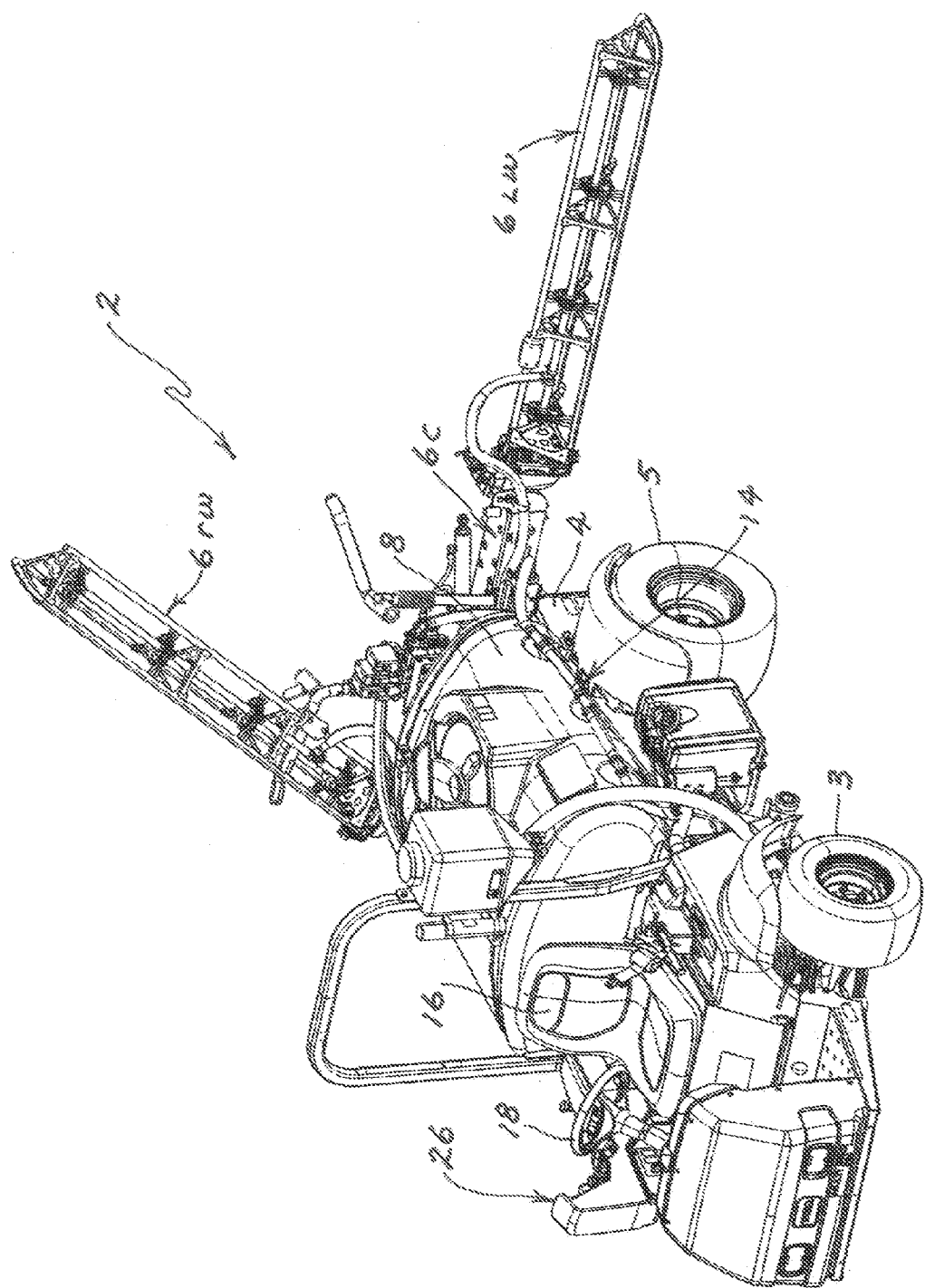
FIG. 1 is a front perspective view of one embodiment of a vehicle mounted sprayer according to this invention.
Figure 2:
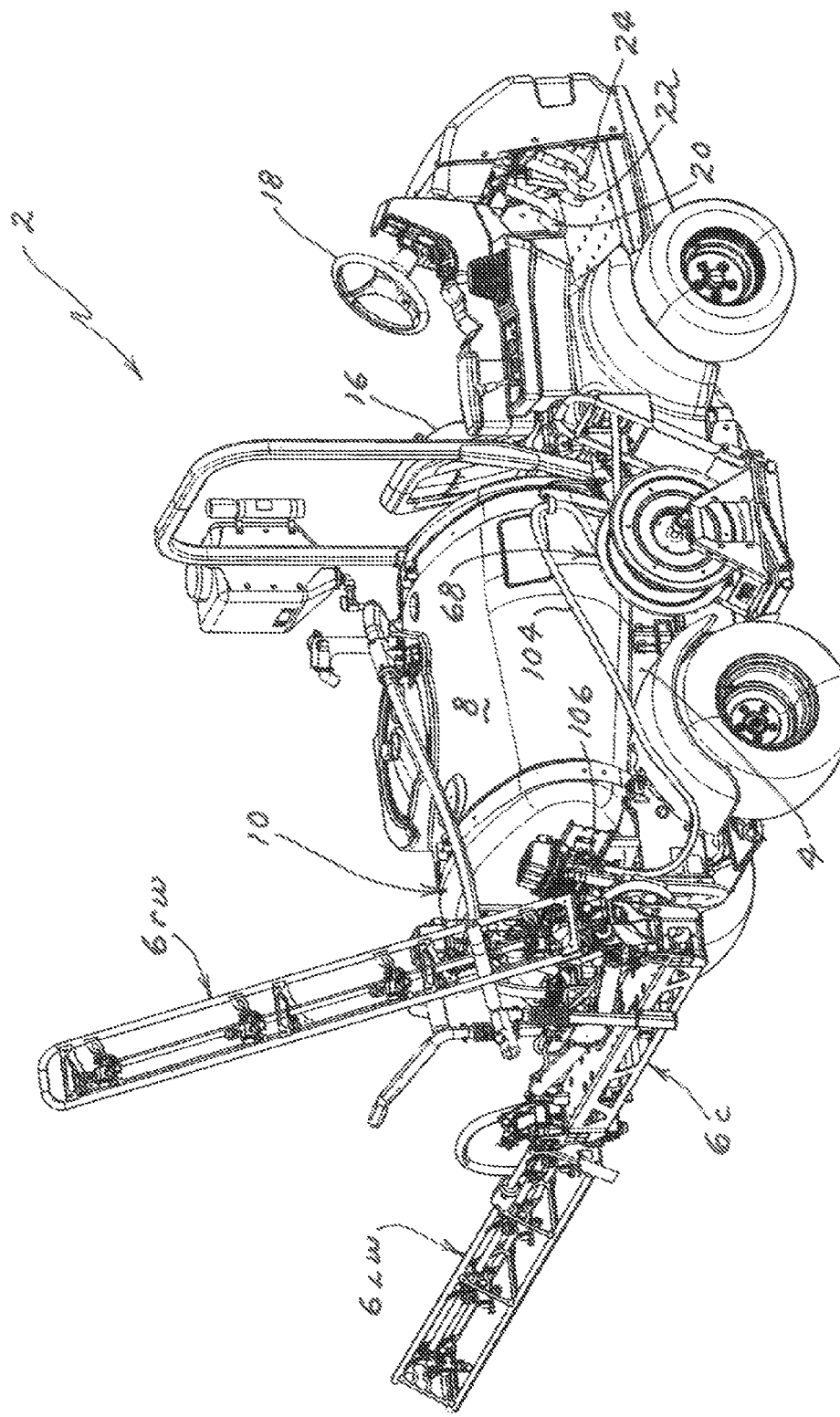
FIG. 2 is a rear perspective view of the sprayer of FIG. 1.

One embodiment of a sprayer according to this invention is illustrated in FIGS. 1 and 2 as 2. Sprayer 2 comprises a self-propelled vehicle frame 4 that is supported for rolling over the ground by a pair of front steerable wheels 3 and a pair of rear drive wheels 5. Sprayer 2 has a power source, such as an internal combustion engine (not shown), that powers rear drive wheels 5 through a traction drive system. One traction drive system that may be used is a manual drive system having a manual shift transmission (not shown) which provides a plurality of speed change gears for varying the ground speed of frame 4 as the operator manually upshifts or downshifts through the gears. Such a manual shift transmission is exceedingly well known in vehicles generally and need not be further described herein.

Sprayer 2 includes one or more spray booms 6 behind frame 4 with each boom 6 having a plurality of downwardly pointing spray nozzles for spraying a spray solution downwardly onto a ground or turf surface over which sprayer 2 is travelling. Preferably, three spray booms 6 are provided comprising a center boom $6_c$, a left wing boom $6_{lw}$ pivotally attached to a left end of center boom $6_c$, and a right wing boom $6_{rw}$ pivotally attached to a right end of center boom $6_c$. When booms 6 are disposed in an operative, spray position, booms 6 are placed substantially end-to-end relative to one another and extend laterally behind frame 4 with the collective length of booms 6 being substantially wider than the lateral wheelbase of frame 4. Booms 6 can also be disposed in a non-operative storage or transport position in which wing booms $6_{lw}$, $6_{rw}$ are placed in an X-shaped orientation above center boom $6_c$. FIGS. 1 and 2 depict the right wing boom $6_{rw}$ having been folded up into its storage position while the left wing boom $6_{lw}$ is shown remaining in the operative spray position.

Such a set of spray booms 6 is disclosed in U.S. Pat. No. 7,364,096, which is owned by The Toro Company, the assignee of this invention. U.S. Pat. No. 7,364,096 is hereby incorporated by reference to more particularly disclose the details of such booms 6, including the actuators (e.g. hydraulic cylinders) that are used to lift and lower wing booms $6_{lw}$, $6_{rw}$ into and out of their storage or transport positions.

Sprayer 2 includes a tank 8 for holding a relatively large volume (e.g. 300 gallons) of a liquid spray solution (e.g. a chemical or chemicals, such as a fertilizer, herbicide, pesticide, fungicide or the like, mixed with water). Sprayer 2 includes a spray system, indicated generally at 10, for withdrawing the spray solution from tank 8 and for pumping the spray solution through the nozzles contained on the various booms 6. In this regard, flow of the spray solution to the various booms 6 can be individually controlled by separate boom valves 12 to allow the operator to select which boom or booms 6 are used for spraying at any given time. In addition, sprayer 2 includes an agitation system, indicated generally at 14, which comprises a plurality of agitation nozzles that are directed into tank 8 and that are distributed along one side of tank 8. The agitation system allows the operator to selectively direct a portion of the flow of spray solution 8 back into tank 8 to keep the chemicals used in the spray solution properly mixed with the water. The details of tank 8, spray system 10, and agitation system 14 are disclosed more fully in U.S. Pat. No. 8,640,972, which is owned by The Toro Company, the assignee of this invention, and which is also incorporated by reference herein.

Frame 4 has an operator's compartment at its forward end that includes a seat 16 for carrying an operator who operates sprayer 2 while in a seated position. The operator's compartment includes a steering wheel 18 that is linked to front wheels 3 through any suitable steering linkage to allow the operator to guide frame 4 by turning steering wheel 18 in one direction or another. As best shown in FIG. 2 and since sprayer 2 includes a manual shift transmission, the operator's compartment includes the usual clutch pedal 20, brake pedal 22, and accelerator pedal 24 for engagement by the operator's feet to drive sprayer 2 in a known manual shift manner. In addition, a control console 26 is placed in the operator's compartment adjacent the right side of seat 16. One aspect of this invention, which will be described in the following section hereof, relates to the ergonomic design and placement of various operational spray and vehicle controls on control console 26.

The Control Console

Figure 3:
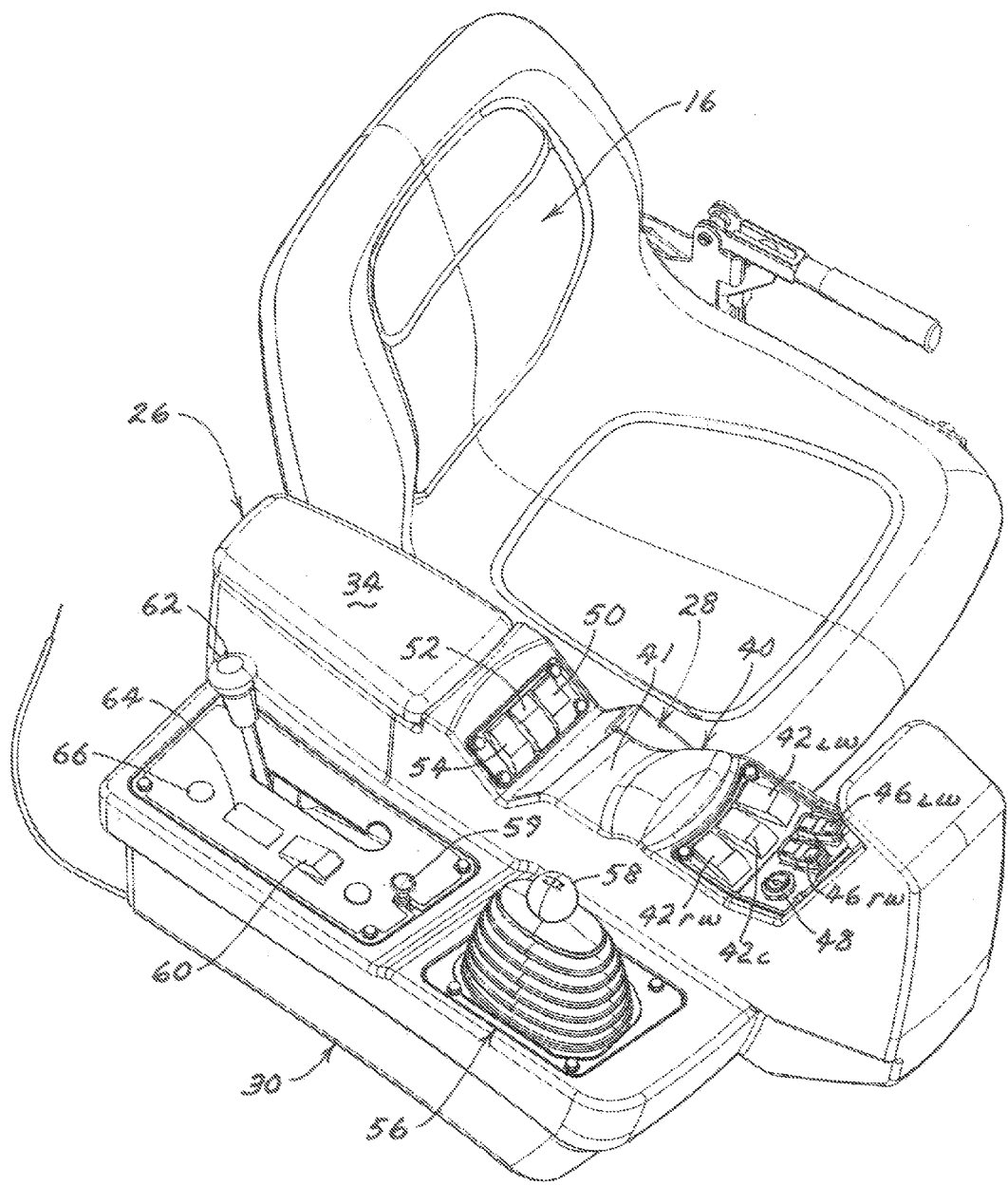
FIG. 3 is a perspective view of an operator's compartment of the sprayer of FIG. 1, particularly illustrating a two-tiered control console carrying various operational spray and vehicle controls.
Figure 4:
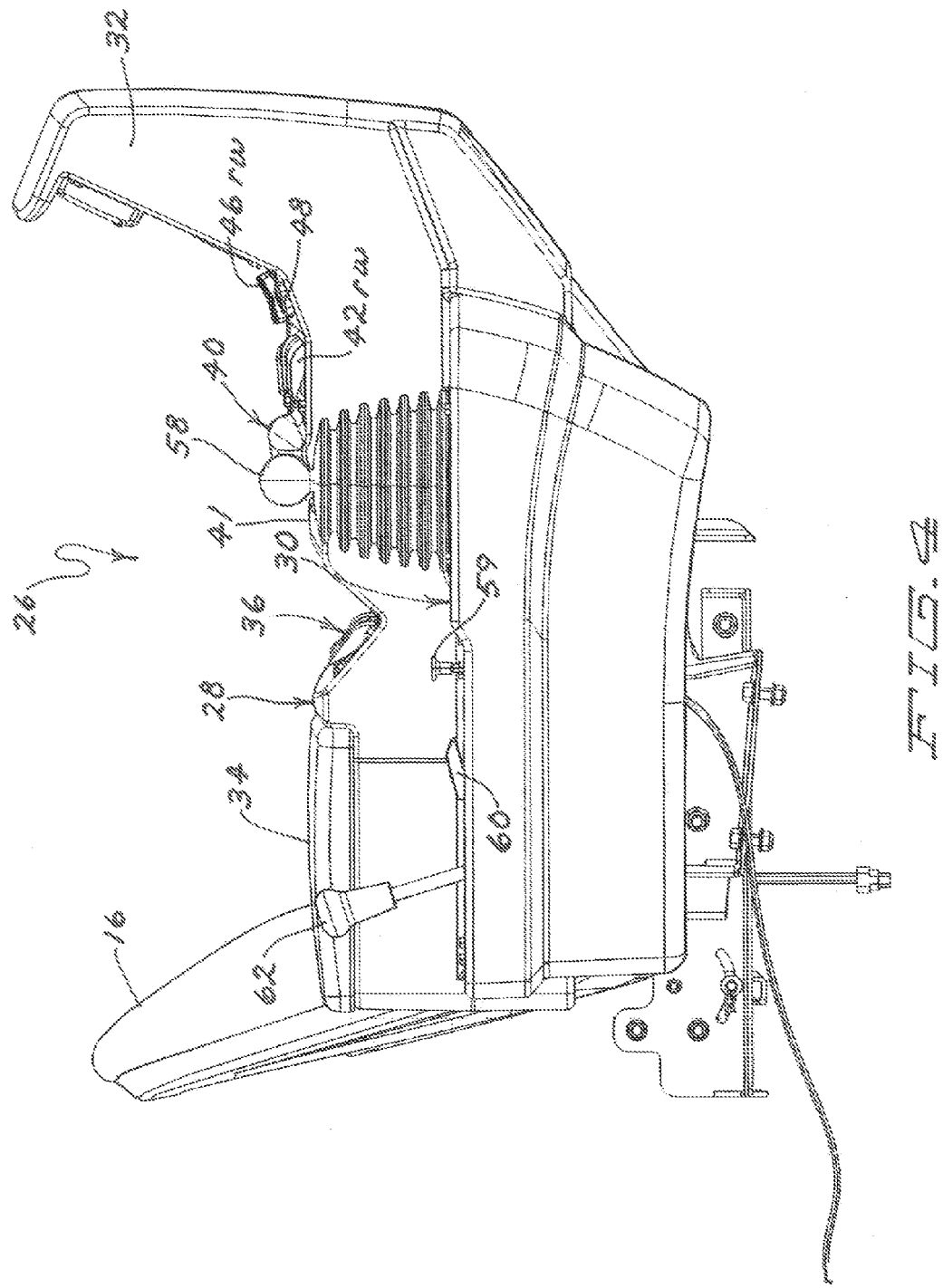
FIG. 4 is a side elevational view of the operator's compartment and control console of FIG. 3.
Figure 5:
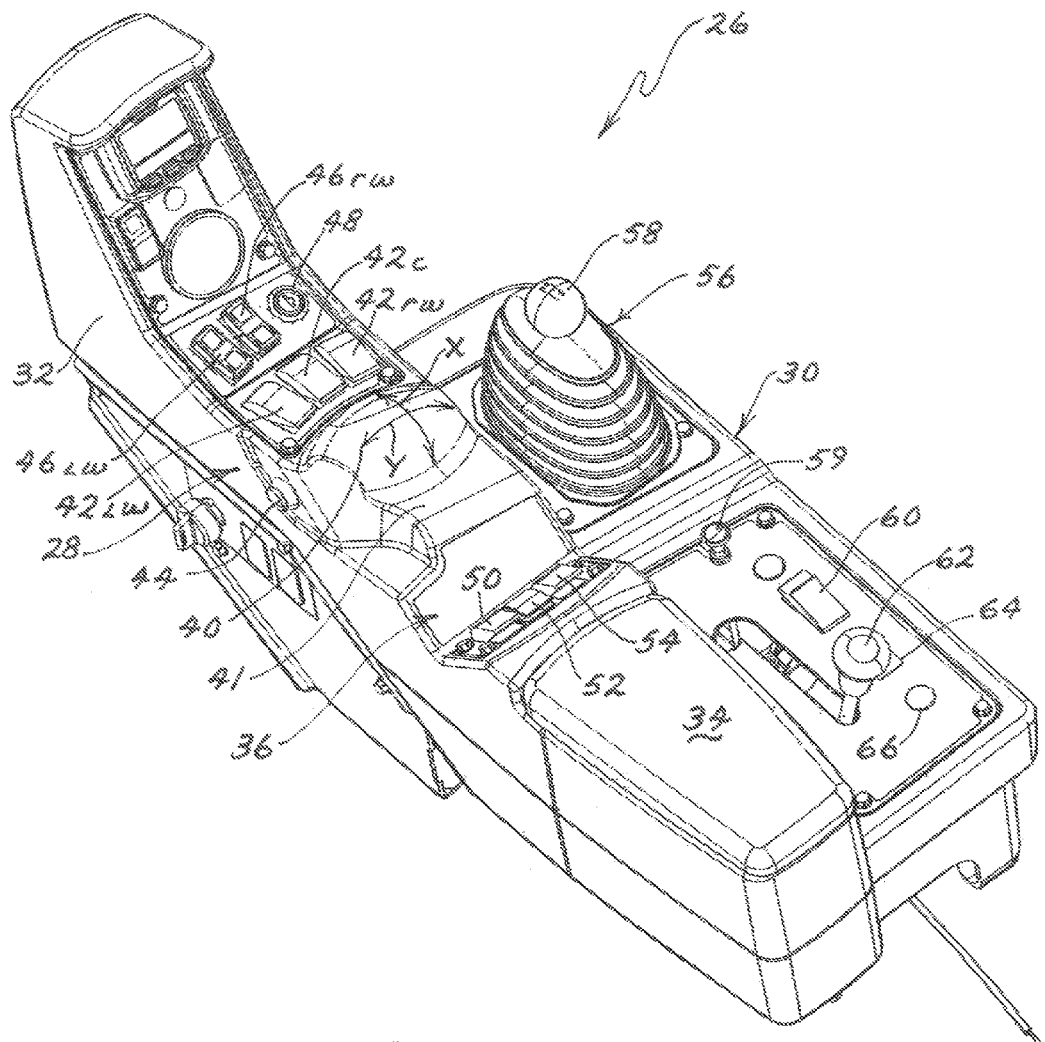
FIG. 5 is a perspective view of only the control console of FIG. 3.

Referring now to FIGS. 3-5, control console 26 comprises an elongated structure that substantially closes off the right side of the operator's compartment such that the operator has to mount and dismount the operator's compartment from the left side of sprayer 2. Control console 26 is a two-tiered console having an inboard, upper tier 28 that is substantially immediately adjacent to the right side of seat 16 and an outboard, lower tier 30 that is substantially immediately to the outside of upper tier 28. Tiers 28 and 30 for most of their lengths effectively define generally horizontal, generally upwardly facing surfaces with the upwardly facing surface of lower tier 30 being markedly lower than the upwardly facing surface of upper tier 28. In addition, upper tier 28 of control console 26 is slightly longer than lower tier 30 with upper tier 28 having an upwardly turned front end 32 that extends forwardly of lower tier 30.

Turning now to a description of upper tier 28 of control console 26, the upwardly facing surface of upper tier 28 forms an armrest for the right arm of the operator. In this regard, the rear portion of the upwardly facing surface of upper tier 28 has a padded armrest cushion 34 on which the operator can rest most of the length of his or her forearm. Immediately ahead of cushion 34 is a V-shaped notch 36 that temporarily interrupts the upwardly facing surface of upper tier 28. However, the upwardly facing surface of upper tier 28 resumes ahead of notch 36 and extends forwardly as far as front end 32 of upper tier 28. Front end 32 of upper tier 28 serves to terminate the upwardly facing surface of upper tier 28 and forms a generally vertical, generally rearwardly facing surface 38 that points towards the operator.

Upper tier 28 of control console 26 forward of notch 36 includes a rounded palm rest 40 that is generally partially spherical in shape. By this, it is meant that palm rest 40 has a generally concave fore-and-aft shape indicated by x in FIG. 5 and a generally concave lateral shape indicated by y in FIG. 5 that generally mimics the shape of the palm of the operator's hand when the operator's hand is in a somewhat curled position as when the operator puts his or hand on palm rest 40. The area 41 immediately to the rear of palm rest 40 but ahead of notch 36 is relatively flat to enable the heel of the operator's palm to rest on area 41 while the palm of the operator's hand curls up against, around and over palm rest 40. Palm rest 40 is sized so that the fingers on the gripping hand will then curl down over the front of palm rest 40 to overlie the area immediately ahead of palm rest 40. The area immediately ahead of palm rest 40 will contain a first group of operational spray controls for spray system 10.

The first group of operational spray controls placed immediately forward of palm rest 40 comprises five control switches that the Applicants have discovered are the most often used in sprayer 2. The first group of operational spray controls is disposed in two rows, namely a first row that is closest to palm rest 40 and a second row that is further away from palm rest 40 and that is located on a slightly upwardly angled portion of upper tier 28. The first row of operational spray controls comprises three on/off, toggle type boom switches $42_{lw}$, $42_c$, and $42_{rw}$ that control the spray to center and wing booms $6_{lw}$, $6_c$, and $6_{rw}$. One boom switch 42 is provided for each boom 6 with the various boom switches 42 being provided in a left, center and right orientation, i.e. boom switches $42_{lw}$, $42_c$, and $42_{rw}$, which corresponds to the orientation of the center and wing booms $6_{lw}$, $6_c$, and $6_{rw}$ on the rear of frame 4. This enables the operator to more easily associate booms switches 42 with the corresponding booms 6 that such switches control, e.g. the operator toggles the left boom switch $42_{lw}$ to control the spray in the left wing boom $6_{lw}$.

Assuming that a master boom switch 44 is placed into a spray position, which master boom switch 44 will be described in more detail hereafter, when boom switch 42 for any one boom 6 is toggled on, spray system 10 causes spray to exit through the nozzles on that boom 6. When boom switch 42 for any one boom 6 is toggled off, the spray through the selected boom 6 is stopped. This allows the operator to selectively turn on or off any of booms 6 in any combination of booms 6 as may be desired by the operator. When the operator's hand is placed with the palm of the operator's hand in engagement with palm rest 40, the fingers of the operator's hand will overlie and rest atop boom switches 42.

The second row of operational spray controls comprises two rocker type lift and lower fold switches $46_{lw}$, and $46_{rw}$ used to lift and lower wing booms $6_{lw}$ and $6_{rw}$ to thereby fold and unfold the wing booms. Again, the left/right orientation of lift and lower switches $46_{lw}$ and $46_{rw}$ on control console 26 mimics the left/right orientation of wing booms $6_{lw}$ and $6_{rw}$ on sprayer 2 to ease the use of such switches by the operator. Lift and lower switches 46 have a neutral center position from which switches 46 can be rocked forwardly by pressing against the top of switches 46 to cause wing booms $6_{lw}$ and $6_{rw}$ to lift or rocked rearwardly by pressing against the bottom of switches 46 to cause wing booms $6_{lw}$ and $6_{rw}$ to lower. As soon as the operator releases a given lift and lower switch 46 from a toggling action, such lift and lower switch 46 will return to neutral and wing boom $6_{lw}$ and $6_{rw}$ will remain in whatever position it had reached when the toggling action was ended. The operator can easily reach lift and lower switches 46 by shifting his or hand slightly forward over the top of palm rest 40 and by extending two fingers forwardly into engagement with switches 46.

Immediately to one side of lift and lower switches 46 is a key switch 48 that may be used for starting or energizing the power source, e.g. the internal combustion engine, which powers sprayer 2 and all its various components. While key switch 48 is not an operational spray control but an operational vehicle control, key switch 48 is the first thing that must be actuated by the operator to use sprayer 2. Thus, it is desirable that key switch 28 be located in an area of control console 26 convenient to the operator and to palm rest 40.

It should be noted that master boom switch 44, which is an on/off switch, is located on the inboard side of upper tier 28 of control console 26 immediately adjacent to the downwardly curved forward side of palm rest 40. In this position, master boom switch 44 may be easily pressed and actuated by the thumb of the operator's hand as the operator rests the palm of his or her hand on palm rest 40. Master boom switch 44 must be placed into an on state to allow any spray through booms 6 although the spray through booms 6 is further individually controllable through the aforementioned boom switches 42. If master boom switch 44 is placed into an off state, spray system 10 is shut off and no spray will pass through booms 6 even if boom switches 42 are otherwise set to allow such spray. Master boom switch 44 is tied to the actuation of an agitation boost feature that will be described in a later section in this Detailed Description.

Notch 36 in upper tier 28 of control console 26 forms an area in which a second group of some important, but less often used, operational spray controls is located. In this respect, by locating the second group of controls down into notch 36, this second group of operational spray controls is located below the operator's forearm as the operator grips palm rest 40 so that the operator's forearm does not lie directly against and/or inadvertently actuate the second group of controls. Preferably, the second group of controls is placed on the rear side of notch 36. This allows the operator to shift his or her hand from palm rest 40 rearwardly until the operator's palm engages with rests on top of the front end of cushion 34. When this occurs, the fingers of the operator's hand will naturally curl down into notch 36 to rest lightly against the second group of operational spray controls.

The second group of operational spray controls comprises a single row of three side-by-side switches. The first switch is an on/off toggle switch 50 that places the pump of spray system 10 into operation when first switch 50 is toggled on so that sprayer 2 is capable of spraying the spray solution through booms 6, assuming of course that master boom switch 44 and the three boom switches 42 are toggled into states that permit such spray. The second switch 52 is an application rate switch that controls an adjustable flow regulating valve 159 in spray system 10 to increase or decrease the flow rate through booms 6. Switch 52 can be pressed in one direction to increase the flow through booms 6, thus increasing the application rate of the spray solution, or in an opposite direction to decrease the flow through booms 6, thus decreasing the application rate of the spray solution. Finally, the third switch 54 is an on/off toggle switch that activates a valve 164 in agitation system 14 to direct a flow of spray solution back to tank 8 through the agitation nozzles to keep the liquid mixture in tank 8 in liquid solution.

Turning now to lower tier 30 of control console 26, this tier is meant mainly to house various operational vehicle controls for frame 4. Chief among these is a gear shift lever 56 that allows the operator to choose between a neutral position, several forward speed change gears, and a reverse gear. As best shown in FIG. 4, a knob 58 on the top of gear shift lever 56 is immediately to the side of and at approximately the same horizontal elevation as palm rest 40 on upper tier 28 of control console 26. Thus, if the operator needs to change gears for any reason, as when the operator wishes to speed up by selecting a higher forward gear or slow down by braking and selecting a lower forward gear, it is a simple matter for the operator to release palm rest 40, to sweep his or her hand slightly to the side and onto knob 58 on gear shift lever 56, make the desired gear shift, and then sweep his or her hand back onto palm rest 40. This can be done easily and without looking given the proximity of knob 58 on gear shift lever 56 to palm rest 40. This eases gear changes in the traction drive system of frame 4.

In addition to gear shift lever 56, the other vehicle function controls contained on lower tier 30 of control console 26 comprise a push/pull manual choke control 59, an on/off switch 60 for the headlights of sprayer 2, and a lever 62 for activating a differential lock in a differential that powers rear drive wheels 5. In addition, lower tier 30 can be used for placement of two operational spray controls for various items that may optionally be used on sprayer 2 and thus are not necessarily present on each sprayer. These controls for optional additions to sprayer 2 comprise a switch 64 for activating a sonic function if sonic spray booms are utilized and a button 66 for activating an electric rewind motor on an optional hose reel assembly 68. Note that various details of hose reel assembly 68 will be described in the next section of this Detailed Description.

Control console 26 provides enhanced ease of use to the operator. For one thing, upper tier 28 of control console 26 serves as a comfortable armrest on which the operator can rest his or her forearm while operating sprayer 2. However, more than that, the rounded, generally partially spherical palm rest 40 serves as a place for the operator to rest his or her palm and thereby be able to quickly find and access the first group of operational spray controls 42 and 46 that are most often used during operation of sprayer 2. This can be done without the operator having to look down and locate the control switches on the console such that the operator can keep his view forwardly to ensure safe operation of sprayer 2 or rearwardly to ensure that the boom spray is functional. The operator can simply find and locate palm rest 40 by feel. Once palm rest 40 is so located, the fingers on the operator's gripping hand will overlie boom switches 42 and be immediately adjacent to lift and lower switches 46. This quick find feature is desirable since it makes it significantly easier for the operator to find and activate the most often used operational spray controls.

In addition, a second group of operational spray controls 50, 52 and 54, albeit controls that are not as heavily used as the first group, is conveniently located on the rear side of notch 36 in upper tier 28 of control console 26. The use of notch 36 to house and place these additional spray controls is further advantageous as it is also easy for the operator to find and use the second group of operational controls 50, 52 and 54. The operator simply shifts his hand slightly rearwardly from palm rest 40 until the operator feels his or her palm engage atop the front end of cushion 34. In this location as noted earlier, the operator's fingers will drop down into notch 36 and overlie the second group of operational controls 50, 52 and 54. Thus, a whole plethora of operational spray controls, from the most heavily used to the more lightly used operational spray controls, are quickly and easily accessible from the upwardly facing top surface of upper tier 28 without the operator having to dodge or avoid any of the operational vehicle controls. Such operational vehicle controls are conveniently located on lower tier 30 of control console 26 immediately adjacent to upper tier 28. Notably, knob 58 on gear shift lever 56 is immediately adjacent and outboard of palm rest 40 of upper tier 28 and at substantially the same vertical elevation as palm rest 40 to be reachable by a slight outward sweeping action of the operator's hand off palm rest 40.

The Pivotal Hose Reel Assembly

A hose reel assembly 48 that may be optionally used on sprayer 2 will now be described. FIG. 2 shows hose reel assembly 48 carried on the right side of sprayer 2 at a location between front wheels 3 and rear drive wheels 5, but hose reel assembly 48 is not limited to this location. The purpose of hose reel assembly 48 is to allow the operator to dismount sprayer 2, to unwind a length of hose from a rotatable hose reel, and to then use a spray gun or walk spray boom on the free end of the hose to manually direct a spray of the spray solution at a desired spot or area. While known prior art vehicle type sprayers had previously been provided with hose reels for this purpose, such hose reels were mounted in a single fixed position on frame 4. It could be difficult given this single position for the operator to pull off a desired length of hose and to orient the hose at the desired spot or area to be sprayed. This could often be done only with considerable tugging or pulling on the hose to flex or bend the length of hose that had been unwound from the hose reel in the desired direction or by relocating or reorienting the entire sprayer 2 when possible.

Referring now to FIGS. 6-12, hose reel assembly 48 has two major components, namely a fixed base 70 that is rigidly secured to one side of frame 4, e.g. the right side of frame 4, and a hose reel 72 that is pivotally mounted on fixed base 70 to allow hose reel 72 to be pivoted about a substantially vertical pivot axis relative to fixed base 70. The vertical pivot mounting of hose reel 72 on fixed base 70 allows hose reel 72 to be pivotally adjusted into one of a plurality of different adjusted positions relative to fixed base 70 and thus relative to the right side of frame 4. This permits the operator to more conveniently position hose reel 72 to more easily unwind the hose from hose reel 72 in a desired direction.

As best shown in FIG. 8, fixed base 70 comprises at one end a vertical post 74 having a mounting bracket 76 for releasably attaching post 74 to the right side of frame 4. The other end of fixed base 70 includes a mounting flange 78 for releasably attaching fixed base 70 to the right side of frame 4 at a second location. Mounting bracket 76 and mounting flange 78 of hose reel assembly 48 securely and rigidly hold fixed base 70 to the right side of frame 4 when hose reel assembly 48 is attached to frame 4. This permits hose reel assembly 48 to be sold as an optional attachment to sprayer 2 and to be mounted on frame 4 only when the operator desires to purchase and install hose reel assembly 48. However, hose reel assembly 48 could be mounted in a permanent fashion to frame 4 if so desired.

Fixed base 70 also includes a substantially horizontal support floor 80 that extends between and is rigidly secured to mounting post 74 and mounting flange 78. Support floor 80 comprises first and second spaced circular tubes 82 having a piece of sheet metal secured thereto to define support floor 80. Support floor 80 includes an upwardly facing aperture 84 having a bushing contained therein with aperture 84 defining part of a vertical pivot connection between support floor 80 and hose reel 72. Support floor 80 further includes an elongated slot 86 along a laterally outermost side thereof which slot 86 forms a portion of a positive locking mechanism between support floor 80 and hose reel 72. Another portion of the positive locking mechanism is a pivotal latch 88 that is pivotally secured to the laterally outermost side of support floor 80 for rotation of latch 88 about a substantially horizontal pivot axis. The operation of latch 88 will be described in more detail hereafter. Finally, support floor 80 includes three truncated triangularly shaped detent openings 90 surrounding aperture 84 in a 90° arc, i.e. at 0°, 45° and 90° respectively.

Continuing to refer to FIG. 8, hose reel 72 comprises a reel drum 92 having a shaft 94 that is journalled for rotation about a substantially horizontal axis by bearings carried atop two laterally spaced trestles 96. Trestles 96 are mounted to a bottom wall 98 such that drum 92 rotates between trestles 96 with a lower portion of drum 92 physically being received between trestles 96. An electric motor 100 is mounted on the laterally innermost trestle 96 and is operatively coupled to drum 92 in any suitable fashion to provide powered rotation of drum 92 for winding a spray hose 102 up on drum 92. A considerable length of hose 102 is capable of being stored on drum 92. Hose 102 is unwound from drum 92 when it is desired to use hose 102 for manual remote spraying purposes with such length thereafter being wound back up on drum 92 using motor 100 when the remote spraying operation is completed.

As best shown in FIG. 7, spray fluid is fed into hose 102 carried on drum 92 through an innermost end of shaft 94, the same shaft which rotatably journals drum 92 for rotation on trestles 96. This spray fluid is supplied to drum 92 through an elongated supply hose 104 that extends between shaft 94 of drum 92 back along the right side of frame 4 to some connection 106 (See FIG. 2) to a part of spray system 10 carried on the rear of frame 4. There is enough length and flex in supply hose 104 that supply hose 104 will not bind or prevent the various adjustments of hose reel 72 that will be described hereafter, but will allow the front end of supply hose 104 connected to shaft 94 of drum 92 to move as need be in concert with the movement of hose reel 72.

Hose reel 72 includes a final portion of the vertical pivot connection between fixed base 70 and hose reel 72, namely a vertical pivot shaft 107 extending downwardly from the underside of hose reel 72. Pivot shaft 107 is received within aperture 84 in support floor 80 of fixed base 70 to pivotally couple hose reel 72 to fixed base 70 for pivoting about a substantially vertical pivot axis. In addition, the underside of hose reel 72 contains a single downwardly extending detent tab 108 that is shaped to be received in any one of detent openings 90 provided in support floor 80 of fixed base 70. Moreover, hose reel 72 includes a short, upwardly extending lip 110 on a laterally outermost side thereof with the underside of hose reel 72 having an elongated slot 112 immediately adjacent to and inside of lip 110. See FIGS. 8 and 9.

Finally, hose reel 72 comprises an elongated, upwardly extending, U-shaped handle 114 116 on a front side of hose reel 72 adjacent to drum 92. Handle 114 is forwardly inclined as it extends upwardly. Handle 114 has an upper horizontal hand grip 116 that the operator may grip to apply torque to hose reel 72 to swing hose reel 72 about the vertical pivot connection between hose reel 72 and fixed base 70. The upper portion of handle 114 has a hose guide slot 118 through which hose 102 passes as it extends outwardly from drum 92. The free end of hose 102 includes a spray gun 120 having a spray nozzle. When hose reel assembly 48 is not in use and a spot spraying operation is not being conducted, spray gun 120 is conveniently housed on the back side of hose reel 72 in a holster provided by a pair of spaced guide tubes 122 and a lower support flange 124. See FIG. 7.

Normally, hose reel 72 lies flat against the right side of frame 4 in the 0° adjusted position shown in FIG. 2. In this position, hose reel 72 has its most laterally inboard position on frame 4 and is contained entirely within the lateral wheelbase of frame 4 so as not to increase the overall width of sprayer 2. In this 0° adjusted position, slot 112 in hose reel 72 will align with slot 86 in support floor 80 of fixed base 70. Latch 88 can then be placed in a locked position in which a downwardly facing, U-shaped free end 126 of latch 88 fits down over lip 110 of hose reel 72. When so fitted, the laterally innermost side of free end 126 of latch 88, which is formed as an extended locking finger 128, is received down through the aligned slots 86, 112 to positively lock or latch hose reel 72 in the 0° adjusted position. In addition, detent tab 108 on the underside of hose reel 72 also fits into detent opening 90 in support floor 80 at the 0° adjusted position, but it is preferable that one not rely only on the holding force provided by the detent tab/detent opening. That is why latch 88 is additionally provided, namely to provide a positive locking mechanism which keeps hose reel 72 in the 0° adjusted position during operation of sprayer 2 so that hose reel 72 does not pivot away from the side of frame 4 during sharp turns of sprayer 2 to one side or another.

Assume now that the operator wishes to stop sprayer 2 and conduct a spot manual spraying operation. Such an operation can be done with hose reel 72 maintained in its 0° adjusted position. However, in the 0° adjusted position, hose 102 can be most easily unwound from drum 92 by pulling hose 102 straight forwardly in a direction generally parallel to the side of frame 4. If the area or spot to be sprayed is substantially straight ahead of hose reel 72, then a straight ahead pull on hose 102 is what the operator would normally do in order to reach the area or spot. However, if the area or spot to be sprayed is laterally offset to the side of sprayer 2 by some appreciable distance, then pulling hose 102 straight ahead forwardly does not orient hose 102 at the area or spot to be sprayed, at least not without flexing and bending hose 102 by dragging it laterally away from frame 4 over the ground. This can be difficult and tiring to do.

In such latter cases, it is easy for the operator to unlock and reorient hose reel 72 into one of its other two adjusted positions on sprayer 2, i.e. either its 45° adjusted position or its 90° adjusted position. Note that FIG. 11 shows hose reel 72 in its 0° adjusted position substantially flat against frame 4 and parallel to frame 4 and that FIG. 12 shows hose reel 72 in its 90° adjusted position extending perpendicularly outwardly from frame 4. The 45° adjusted position would be in the middle between the two positions shown in FIGS. 11 and 12. Other increments of adjustment could be provided, but having the three adjusted positions disclosed herein at 0°, 45° and 90° relative to frame 4 is sufficient for most situations.

To unlock and reposition hose reel 72, the operator first unlocks latch 88 between fixed base 70 and hose reel 72. The outer side of latch 88 is formed with a small, outwardly extending, horizontal lip 130 at the bottom thereof. The operator can place his or her foot beneath lip 130 and lift upwardly with his or her foot to lift latch 88 and withdraw locking finger 128 of latch 88 from the aligned slots 86, 112. If the operator continues with the lifting action, the operator can pivot latch 88 overcenter until latch 88 falls rearwardly and is stopped in a fully unlatched position by virtue of latch 88 coming into engagement with a laterally outermost end of rear tube 82 on support floor 80. This is illustrated in FIG. 10.

With latch 88 in its fully unlatched position as shown in FIG. 10, the operator can then simply grip hand grip 116 of handle 114 of hose reel 72 and pull outwardly on hand grip 116 to swing hose reel 72 outwardly about its vertical pivot connection to fixed base 70. The operator can pull in this manner until detent tab 108 on hose reel 72 seats in the detent opening 90 at either the 45° adjusted position or the 90° adjusted position, depending upon which position orients hose reel 72 most directly at the area or spot which the operator wishes to spray by hand. This allows the operator to unwind hose 102 from drum 92 and orient hose 102 at the desired area or spot with a minimum effort and without having to substantially reorient hose 102 after it has been unwound from drum 92. After the manual spraying operation is concluded, the operator rewinds hose 102 and can then use handle 114 to push hose reel 72 back to its 0° adjusted position. Once this position is reached, the operator can then use his foot or hand to kick latch 88 forwardly from its rearwardly oriented overcenter position shown in FIG. 10. As latch 88 moves forwardly and passes into a forward overcenter position, the force of gravity takes over and causes latch 88 to automatically reset with the U-shaped free end of latch 126 refitting itself over lip 110 of hose reel 72 and with locking finger 128 passing back down through the aligned slots 86, 112.

Hose reel assembly 48 of this invention is simple and durable in structure and easy to use. It also provides the operator with the ability to tailor or select the orientation of hose reel 72 relative to frame 4 to minimize the work required in unwinding hose 102 from hose reel 72 and getting it properly oriented relative to the area of spot to be sprayed. It is thus desirable for the sake of operator convenience and ease of use.

The Hill Assist System

It is not uncommon for sprayer 2 to be used on somewhat hilly terrain, such as the undulating terrain of today's golf courses. This means that the operator has to drive sprayer 2 up and down hills of various sizes in order to properly spray the entire terrain of the golf course. In certain situations, the operator might need to bring sprayer 2 to a halt before completing the ascent up a hill. In such situations and given the manual transmission used in the traction drive of sprayer 2, the operator can hold sprayer 2 on the hill by keeping clutch pedal 20 depressed with one foot and brake pedal 22 depressed with his or her other foot with sufficient force that the service brakes of sprayer 2 develop sufficient braking force to keep sprayer 2 stationary. However, when attempting to restart the ascent up the hill from a standing stop, the operator has to keep clutch pedal 20 depressed and shift his other foot as quickly as possible from brake pedal 22 to accelerator pedal 24 in an attempt to reengage the traction system to reestablish forward motion of sprayer 2. This is difficult to do without having either sprayer 2 roll back down the hill some distance before forward motion is reestablished or without having a jerky restart up the hill.

To ease the operator's burden in operating sprayer 2 in such situations, it is preferable to provide the operator with a hill assist system that would automatically hold sprayer 2 in a substantially stationary position when stopped on a hill and that would give the operator a period of time during this automatic hold in which to move his foot from brake pedal 22 to accelerator pedal 24 and to begin depressing accelerator pedal 24. Such a hill assist system according to this invention is indicated generally as 132 in FIG. 13.

Hill assist system 132 comprises a solenoid operated valve 134 installed in a hydraulic brake system of sprayer 2. The brake system comprises hydraulically operated service brakes 136 on front wheels 3 as well as hydraulically operated service brakes 138 on rear wheels 5. A master brake cylinder 140 is the source of pressurized brake fluid with the cylinder progressively developing such pressure according to the degree that brake pedal 22 is depressed from an unactuated home position. In the home position, the operator's foot is off or is not pushing against brake pedal 22 such that the hydraulic pressure to front and rear service brakes 136, 138 is insufficient to develop any braking force. As the operator pushes down on brake pedal 22, hydraulic fluid is forced by the motion of master brake cylinder 140 into front and rear service brakes 136, 138 with the pressure of the fluid increasing according to how far brake pedal 22 is depressed. At some point, the brake system will develop sufficient brake pressure to keep the service brakes of sprayer 2 engaged with sufficient braking force to hold sprayer 2 stationary even on steep hills.

Figure 13:
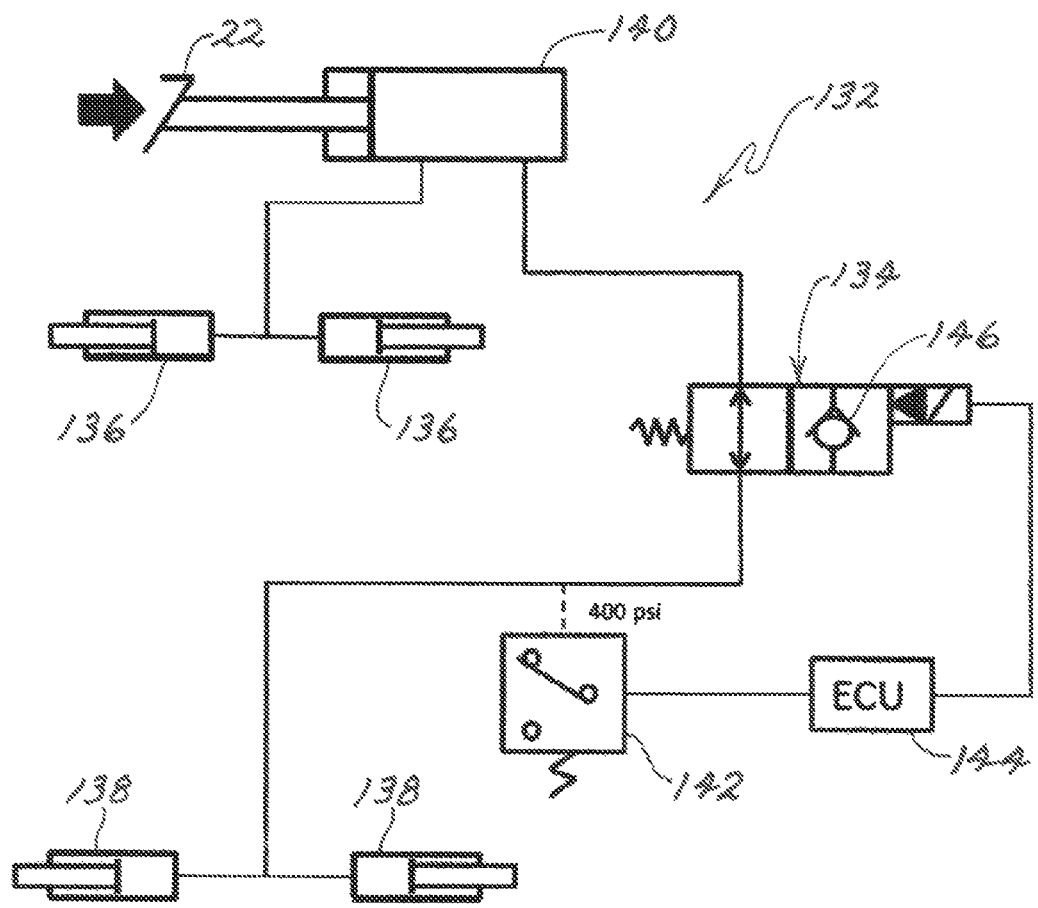
FIG. 13 is a schematic diagram of a hill assist circuit for the sprayer of FIG. 1 which eases for the operator the task of restarting forward motion of the sprayer up a hill when the sprayer had previously been stopped by the operator on the hill.

A pressure sensor 142 is inserted into the brake system to monitor the brake pressure in the line or lines feeding rear service brakes 138. Sensor 142 is set to switch from one state to another state when a relatively high brake pressure, e.g. 400 psi, is reached. At this point, sensor 142 sends a signal to an electronic control unit (ECU) 144 connected to sensor 142. When ECU 144 receives a signal from sensor 142, ECU 144 sends a signal to valve 134 which has been inserted into the brake system in the line or lines leading to rear service brakes 138. When valve 134 receives this signal from ECU 144, valve 134 shifts from the open state thereof as shown in FIG. 13 to a closed state in with the line or lines feeding rear service brakes 138 are blocked by the check valve. This action of valve 134 effectively locks in at least the predetermined pressure level set by sensor 142, i.e. the 400 psi level in the example above, but permits pressures above that level to continue to be developed by the depression of brake pedal 22 since check valve 146 can still open to permit additional fluid flow and additional pressure to be developed in the line or lines leading to rear service brakes 138.

The activation of valve 134 as described above, i.e. locking in at least a 400 psi pressure level in the line or lines feeding rear service brakes 138 for as long as ECU 144 keeps sending a signal to valve 134, ensures that rear service brakes 138 have a braking force sufficient to keep sprayer 2 substantially stationary even on steep hills. This assumes that activation of valve 134 has occurred when sprayer 2 has come to a complete stop with the operator having pushed in clutch pedal 20 to disengage the transmission clutch and with the operator holding brake pedal 22 sufficiently depressed with the other foot. The operator continues to hold frame 4 stationary with the two pedals in these conditions, both clutch pedal 20 and brake pedal 22 depressed and out of their unactuated home positions.

Now, let's assume that the operator wishes to restart forward motion of sprayer 2 up the hill. What the operator needs to do is to keep clutch pedal 20 depressed and out of its home position, to release brake pedal 22 to allow brake pedal 22 to return to its home position, and to shift the foot that had been holding brake pedal 22 to accelerator pedal 24. The operator can then depress accelerator pedal 24 as he or she gradually lets off clutch pedal 20 to resume forward motion. ECU 144 constantly monitors the positions of clutch pedal 20 and brake pedal 22 in order to cut off the signal to valve 134 after a short predetermined brake holding period of time (e.g. 1.5 to 2.5 seconds) deemed sufficient for the operator to perform the above actions and regain forward motion. ECU 144 has a timer function that begins to count down through the predetermined brake holding period of time only when the following two conditions are met, namely clutch pedal 20 must still be out of its home position indicating that clutch pedal 20 is still depressed by the operator and brake pedal 22 must have returned to its home position indicating that brake pedal 22 has been released by the operator. These two conditions are determined by appropriate sensors (not shown) connected to the clutch and brake pedals.

The net result of the operation of hill assist system 132 is that sprayer 2 automatically retains sufficient braking pressure to at least rear service brakes 138 to hold frame 4 substantially stationary on even a steep hill, this braking pressure is maintained for a predetermined hold time as the operator transitions his foot from brake pedal 22 to accelerator pedal 24 to reestablish forward motion, and this braking pressure is released after the hold time expires. To the operator, the effect is seamless and undetectable. The operator is simply able to smoothly reestablish forward motion of sprayer 2 up the hill without having undue jerkiness or roll back of sprayer 2 back down the hill. In addition, sensor 142 in the hill assist circuit serves as a gatekeeper to ensure that hill assist system 132 comes into play only when it is truly needed. At brake pressures less than the predetermined level (e.g. less than the 400 psi in the example above), sensor 142 never changes state, ECU 144 never receives a signal from sensor 142, and the solenoid activated valve is never activated. This prevents the operation of hill assist system 132 in situations where it is not needed, i.e. when sprayer 2 is on substantially flat or level ground or on slightly inclined hills, and the pressure developed in the brake system is less than 400 psi.

The Agitation Boost System

Figure 14:
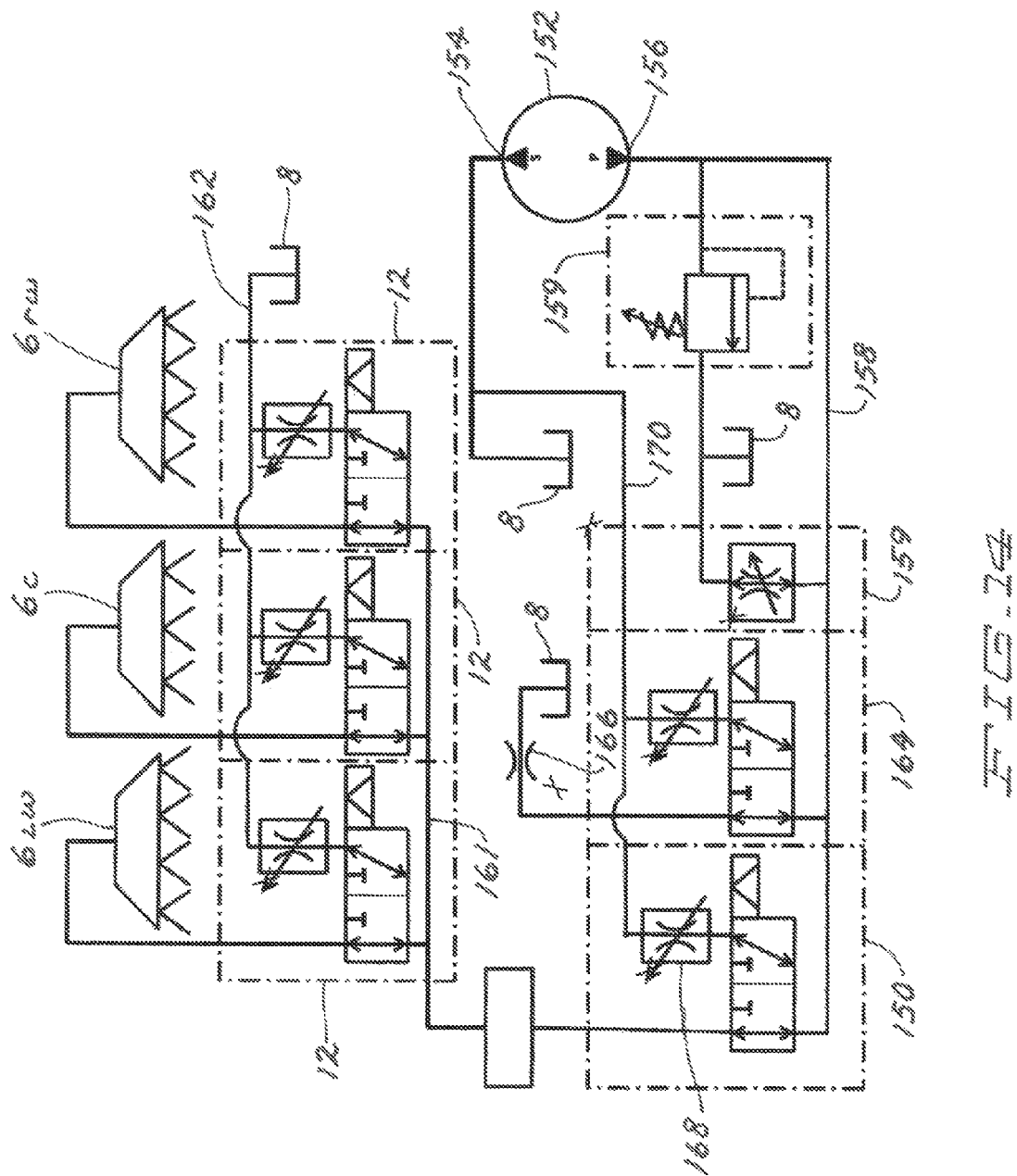
FIG. 14 is a schematic diagram of the spray and agitation systems of the sprayer of FIG. 1, particularly illustrating an agitation boost system for supplementing the flow through the agitation system when the spray to the booms is cut off using a master boom switch.

Spray system 10 of sprayer 2 of this invention is schematically shown in FIG. 14. Spray system 10 of this invention is similar in many ways to spray system 10 shown in U.S. Pat. No. 8,640,972, previously incorporated by reference herein. The major difference between spray system 10 of this invention and that in the '972 Patent is the addition of a master boom valve 150 that is operated by master boom switch 44 when master boom switch 44 is selectively put into an on state by the operator. This will be described in more detail hereafter. However, in order to better understand the operation of master boom valve 150 and the agitation boost that it provides, a brief summary of the previously known spray system to which master boom valve 150 is added herein is in order.

Spray system 10 includes tank 8 carried on frame 4 for holding a quantity of the spray solution. FIG. 14 shows what appears to be multiple tanks 8, but this is for the sake of drawing convenience only. There is only one tank 8 which is shown multiple times in FIG. 14 to avoid having flow lines unduly cross over one another multiple times. In addition to tank 8, there is a pump 152 having an inlet 154 connected to tank 8 for withdrawing the spray solution from tank 8 and an outlet 156 for dispersing the withdrawn spray solution. In order for any spraying to occur, pump 152 obviously has to be actuated from the power source carried on frame 4. A pressure relief valve 157 opens if pump pressure exceeds an upper predetermined limit to relieve pump pressure and protect pump 152.

The outlet flow from pump 152 travels along an outlet line 158 through the adjustable flow regulating valve 159 for setting the application rate of the spray solution, then through an agitation valve 164 to be described hereafter, and then through master boom valve 150. Master boom valve 150 is shown in its normal on state. In this state, master boom valve 150 simply allows flow from pump 152 to pass unimpeded therethrough to travel through a flow meter 160 and into a supply line 161 to center boom $6_c$ and wing booms $6_{lw}$ and $6_{rw}$. Each boom 6 has its own boom valve 12 that allows the flow to booms 6 to be individually controlled through the operation of the aforementioned boom switches 42 which are operatively connected to boom valves 12. When all boom valves 12 are open, the flow passing through master boom valve 150 is received by each boom 6 and is sprayed out onto the ground or turf surface through the spray nozzles carried on each boom 6. However, any one, or any two, or all three of boom valves 12 can be put into their off states by suitable actuation of boom switches 42 to cause the spray flow through such selected booms 6 to be cut off. When this happens, the flow of the spray solution towards any shut off booms 6 will be directed back to tank 8 through a bypass return line 162.

In the prior art spray system of the product shown in the '972 Patent, there was a master boom switch that could also be actuated, but such actuation only resulted in all three of boom valves 12 being closed so that the flow returned to tank 8 only through the return line 162. Such return line 162 brought such return flow back to tank 8 only through a single port or opening into tank 8. Thus, such return flow was relatively ineffective for agitating the spray solution contents of tank 8. Sending such return flow from the booms back to tank 8 through return line 162 did not take advantage of the fact that tank 8 had a separate agitation system with a plurality of agitation nozzles distributed around tank 8 in different locations. Such an agitation system in spray system 10 shown in the '972 Patent is put into operation by the separate agitation valve 164 that is connected to outlet line 158 of pump 152. When agitation valve 164 is opened, a portion of the pump flow along outlet line 158 is sent through agitation valve 164 and through the distributed set of agitation nozzles, diagrammatically indicated at 166 in FIG. 14, into tank 8 for spray solution agitation purposes.

The addition of a separate master boom valve 150 operated by master boom switch 44 now makes it possible to tie master boom valve 150 into agitation valve 164. Now, when master boom switch 44 is actuated into an off state and master boom valve 150 shifts over into the closed state thereof, the flow that would have passed through master boom valve 150 on its way to booms 6 is now available to also enter agitation valve 164 assuming agitation valve 164 is in an open rather than closed state such that tank agitation is on. A portion of the available flow from master boom valve 164 is added to the flow that would have passed through the settings of agitation valve 164 to boost the flow volume through agitation valve 164 to thereby boost the flow through the agitation nozzles. This feature provides more effective agitation than simply returning that flow to tank 8 through a return line 162 as in the prior art. This keeps the spray solution in tank 8 more completely mixed.

In fact, the boost through agitation system 14 by using master boom switch 44 to potentially divert the flow headed to booms 6 through agitation valve 164 is so effective that it can unduly froth the contents of tank 8. Thus, the master boom valve has an adjustable flow bypass 168 that is provided to allow the operator to manually limit the amount of the flow boost coming from master boom valve 150. Flow bypass 168 causes any bypass portion of the flow that the operator decides not to use as a boost through agitation valve 164 to be sent directly back to tank 8 through a return line 170.

The Alternative Control Console

Sprayer 2 described earlier herein is in the form of a dedicated, single purpose sprayer that is designed for spraying turf or ground surfaces and has no other purposes. However, sprayers are also known in which a utility vehicle, such as a vehicle from the line of Workman® utility vehicles manufactured and sold by The Toro Company, is converted into a sprayer, on a temporary or permanent basis, by adding the various components of sprayer 2 to such a utility vehicle. The '972 Patent shows a sprayer of this type, namely a Workman® utility vehicle with a spray solution tank added to the bed of frame 4, with the center boom and wing booms added to the rear of frame 4, and with the various components comprising the spray and agitation systems further being added to frame 4. In such a vehicle used as a mobile platform for sprayer 2, the operational vehicle controls, such as gear shift lever 56, choke 59, headlight switch 60, etc. are already installed and present in frame 4. Such operational vehicle controls do not, therefore, need to be built in as part of control console 26.

Figure 15:
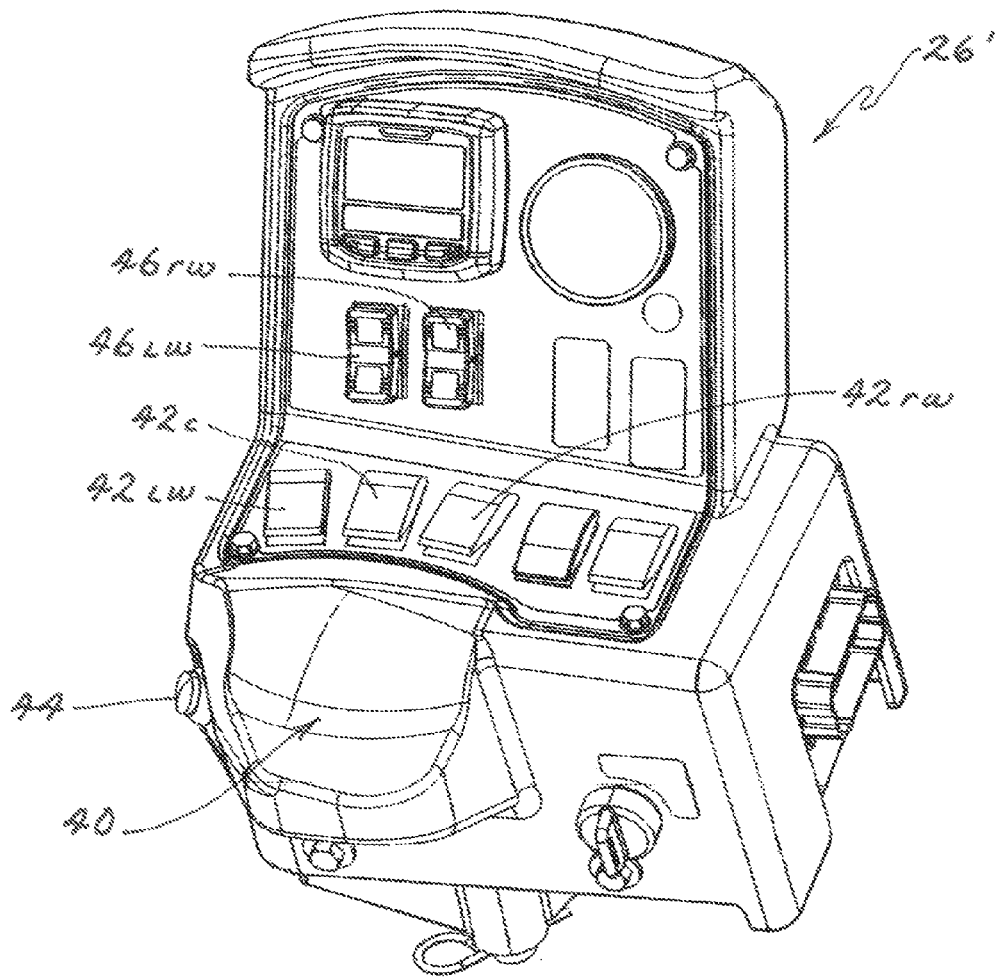
FIGS. 15 and 16 are perspective views of a second embodiment of a control console that can be used in a sprayer in which the components of the sprayer are carried in a utility vehicle, such as a Workman® utility vehicle.
Figure 16:
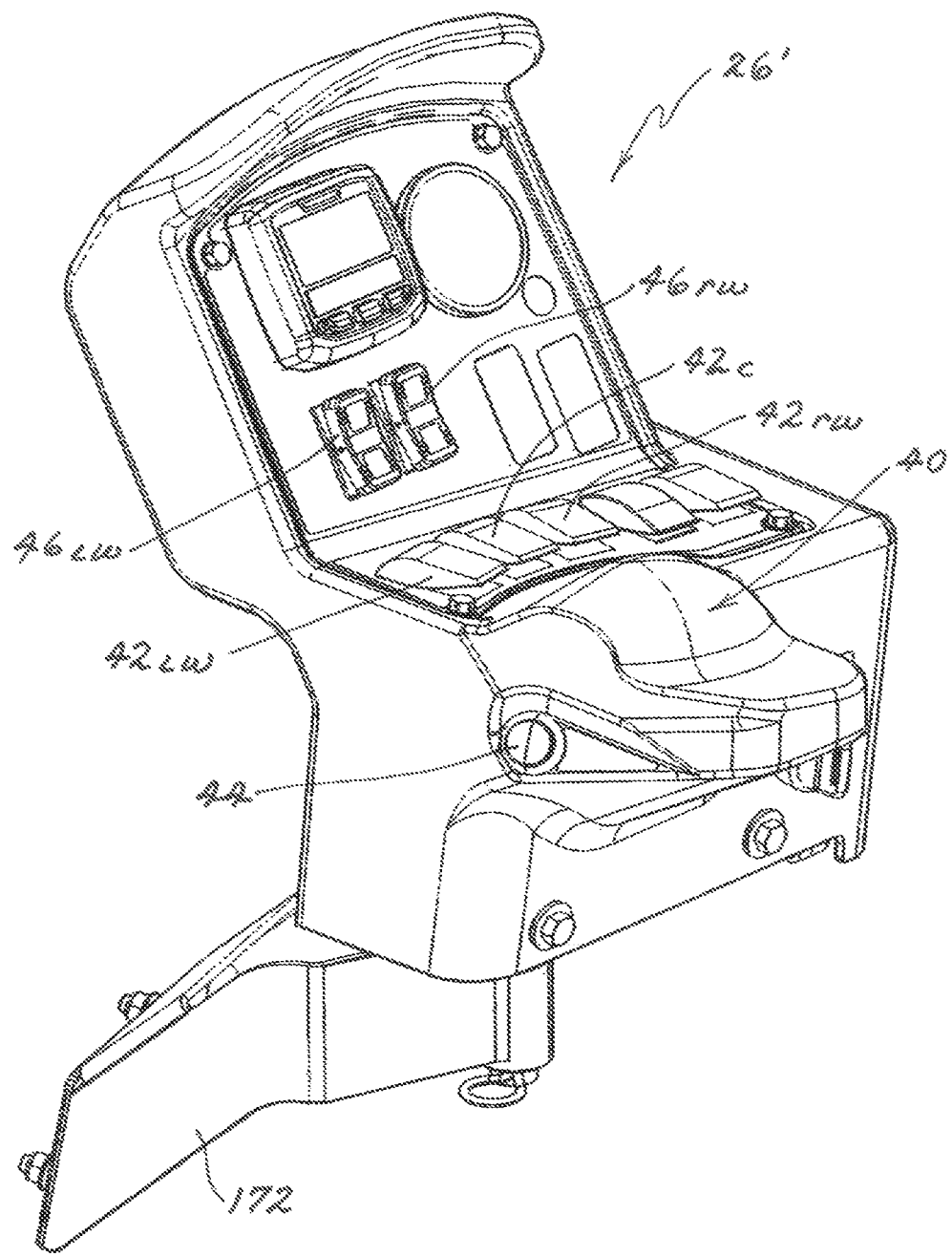

FIGS. 15 and 16 depict an alternative form or additional embodiment of a control console 26' according to this invention of the type that might be used in a Workman® type utility vehicle that has been converted into a sprayer. As is apparent, control console 26' is no longer in a two-tiered form, is no longer part of an armrest, and no longer closes off one side of the operator's compartment since the Workman® utility vehicle has two side-by-side seats arranged in the operator's compartment. One seat is for the driver of frame 4 and the other seat for a passenger. As a result, control console 26' of the second embodiment is simply a relatively compact box having a mounting bracket 172 for allowing control console 26' to be bolted into place in the operator's compartment. One suitable location would be on or near the dashboard of frame 4 generally between the two seats such that console 26' could be reached and accessed by either the driver or the passenger of frame 4.

Significantly, however, it is preferred that control console 26' share the quick find feature for helping the operator quickly locate and operate the most often used operational spray controls, namely the three boom switches $42_{lw}$, $42_c$, and $42_{rw}$ for turning booms 6 on and off as well as lift and lower switches $46_{lw}$ and $46_{rw}$ for the wing booms. Thus, a rear end of control console 26' includes the same rounded, partially spherical palm rest 40 as control console 26 of the first embodiment. As was true in control console 26, boom switches 42 and lift and lower switches 46 are located in two rows in front of palm rest 40. Boom switches 42 are closest to and immediately ahead of palm rest 40 and are on a relatively flat, horizontal surface of control console 26'. Lift and lower switches 46 are in a row a slight distance further forwardly from palm rest and are located on an upwardly inclined surface of control console 26'.

Palm rest 40 preferably does not extend all the way across the width of control console 26', but is positioned to be directly adjacent the three boom switches 42. Thus, when the operator feels for palm rest 40 and grips palm rest 40 with his palm resting on palm rest 40, with the heel of the operator's palm resting on the flat surface 41 immediately to the rear of palm rest 40, and with the fingers of the operator's hand curling up and over palm rest 40, this will inherently position such fingers, and the operator will know that his or her fingers are so positioned, on top of boom switches 42. The operator will also know or be aware of the fact that the lift and lower switches 46 are just above boom switches 42. Finally, master boom switch 44 retains its preferred position along the laterally innermost side of palm rest 40 to be easily accessible by the operator's thumb while the operator's hand is so positioned against palm rest 40. This provides the second embodiment of control console 26' disclosed herein with the same ease of use and easy to find features with respect to the major operational spray controls of sprayer 2 as are possessed by the first embodiment of control console 26.

Modifications

The various features of aspects of sprayer 2 disclosed herein, namely control console 26, 26' with the quick find feature for the most often used operational spray controls, hose reel assembly 48 with pivotal hose reel 72, hill assist system 132, and the agitation boost system, are independently useful with respect to one another. In other words, a particular sprayer could beneficially use any one or more of these items without necessarily using all the rest of the items. For example, a sprayer could be equipped with just hill assist system 132 without using control console 26, hose reel assembly 48, or the agitation boost system. Thus, these items can be used in a particular sprayer 2 in any desired combination of one or more of the items.

In addition, various structural modifications would be apparent to those skilled in the art. Thus, the scope of this invention is not limited to the details of the various embodiments disclosed herein. Instead, the scope of this invention shall be limited only by the appended claims.

The invention claimed is:

1. A sprayer for applying a liquid spray solution to a ground or turf surface, which comprises:
   (a) a frame that is movable over the ground or turf surface, the frame having an operator's compartment thereon for carrying an operator;
   (b) a tank carried by the frame for holding the liquid spray solution;
   (c) a spray system carried by the frame for withdrawing the liquid spray solution from the tank and for spraying the liquid spray solution downwardly onto the ground or turf surface, wherein the spray system comprises:
      (i) a plurality of laterally extending spray booms carried on the frame with the spray booms collectively covering a spray swath that is larger than a lateral wheelbase of the frame; and
      (ii) a plurality of downwardly facing spray nozzles carried on each of the spray booms for spraying the liquid spray solution downwardly onto the ground or turf surface;

(d) a control console in the operator's compartment for controlling the spray of the liquid spray solution from the spray booms, wherein the control console comprises:
  (i) a rounded palm rest that is sufficiently curved to permit the operator to rest a palm of his or her hand against a rear side of the palm rest with the operator's hand curling up and over the palm rest such that fingers of the operator's hand at least partially overlie a front side of the palm rest; and
  (ii) a plurality of on/off boom switches equal in number to the number of the spray booms for individually stopping and starting spraying of the liquid spray solution from the spray booms, the boom switches being positioned on the control console such that the fingers of the operator's hand are immediately proximate to the boom switches as the operator's hand grips the palm rest with the palm of the operator's hand engaging against the rear side of the palm rest.

2. The sprayer of claim 1, wherein the boom switches are located so that some of the operator's fingers rest atop the boom switches as the operator's hand grips the palm rest.

3. The sprayer of claim 2, wherein the boom switches are located substantially immediately forwardly of the palm rest on a substantially horizontal, upwardly facing surface of the control console.

4. The sprayer of claim 3, wherein at least one of spray booms is operatively movable on the frame to be capable of being inwardly folded on the frame into a storage/transport position and outwardly unfolded on the frame into an operative spray position, wherein the control console includes a number of fold switches equal in number to the number of spray booms that can be folded and unfolded on to the frame with the fold switches individually controlling the folding and unfolding of the spray booms, and wherein the fold switches are disposed on the control console substantially immediately forwardly of the boom switches to be easily accessible to the fingers of the operator's hand by virtue of the operator extending various of his or her fingers equal to the number of fold switches forwardly of the boom switches in order to reach and actuate the fold switches.

5. The sprayer of claim 4, wherein the fold switches are located on an upwardly inclined surface of the control console that is substantially immediately forward of the substantially horizontal, upwardly facing surface of the control console that carries the boom switches.

6. The sprayer of claim 5, wherein the fold switches comprise three position, rocker type switches having an off position, a first position in which the rocker type switch has been rocked in one direction relative to the off position for folding the spray booms, and a second position in which the rocker type switch has been rocked in an opposite direction relative to the off position for unfolding the spray booms.

7. The sprayer of claim 4, wherein the spray booms comprise a center boom carried on the vehicle and a pair of wing booms pivotally mounted to opposite ends of the center boom such that the pair of wing booms comprise the booms that can be folded and unfolded on the vehicle, wherein the boom switches are three in number and the fold switches are two in number, the boom switches being arranged in a first side-by-side row and the fold switches being arranged in a second side-by-side row ahead of the first row.

8. The sprayer of claim 1, wherein the control console comprises a notch substantially immediately behind the palm rest and an elongated, substantially horizontal armrest portion positioned behind the notch and serving as an armrest for a portion of a forearm of the operator with the operator's forearm extending forwardly from the armrest portion over the notch to allow the operator's hand to grip the palm rest, and wherein a second group of operational spray controls other than the boom switches are contained within the notch below and out of contact with the operator's forearm as the operator grips the palm rest.

9. The sprayer of claim 8, wherein the notch has a rear wall forming a rear side of the notch, wherein the rear wall of the notch carries the second group of operational spray controls such that the second group of operational spray controls may be actuated by the operator by shifting his or her hand rearwardly from the palm rest until the operator's hand rests atop a front end of the armrest with the fingers of the operator's hand curling down over the rear wall of the notch to overlie the second group of operational spray controls.

10. The sprayer of claim 8, wherein the palm rest, the boom switches, the notch, and the armrest are placed on an upper tier of the control console that is inboard and adjacent to the operator in the operator's compartment, and wherein the control console has a lower tier that is outboard of the upper tier and that is at a lower elevational level than the upper tier, the lower tier of the control console carrying various operational vehicle controls including a gear shift lever, the gear shift lever having an upper end that is adjacent to, outboard of, and at substantially the same vertical elevation as the palm rest so that the operator can find and use the gear shift lever by sweeping his or her hand laterally off the palm rest to substantially immediately reach the gear shift lever and can return his or hand back to the palm rest by sweeping his or hand in an opposite lateral direction from the gear shift lever back to the palm rest after using the gear shift lever.

11. The sprayer of claim 1, further including a master boom switch located on an upper portion of an inboard side of the control console adjacent to the palm rest such that the master boom switch can be actuated by a thumb of the operator as the operator grips the palm rest with his or her hand, the master boom switch controlling stopping and starting spraying of the liquid spray solution from the spray booms independently of the stopping and starting provided by the boom switches.

12. A sprayer for applying a liquid spray solution to a ground or turf surface, which comprises:
  (a) a frame that is movable over the ground or turf surface;
  (b) a tank carried by the frame for holding the liquid spray solution;
  (c) a spray system carried by the frame for withdrawing the liquid spray solution from the tank and for spraying the liquid spray solution downwardly onto the ground or turf surface, wherein the spray system comprises:
    (i) at least one laterally extending spray boom carried on the frame and
    (ii) a plurality of downwardly facing spray nozzles carried on the at least one spray boom for spraying the liquid spray solution downwardly onto the ground or turf surface;
  (d) a hose reel assembly mounted to one side of the frame and capable of selectively receiving liquid spray solution from the spray system during a manual spraying operation, wherein the hose reel assembly comprises:
    (i) a fixed base on the one side of the frame;
    (ii) a hose reel carrying a length of hose that may be unwound from a rotatable drum of the hose reel for use in a manual spraying operation and that may be rewound on the drum of the hose reel at a conclusion of the manual spraying operation, the hose reel being pivotally carried atop the base for pivotal movement about a substantially vertical pivot axis to allow the hose reel to be disposed by an operator substantially against and parallel to the one side of the frame in a first adjusted position thereof and to allow the hose reel to be swung away by the operator from the one side of the frame into at least one additional adjusted position thereof in which the hose reel is angled away from the one side of the frame to provide the drum with a plurality of adjusted positions that can be selected depending upon which direction the hose is most desirably oriented in for a particular manual spraying operation; and (e) a positive locking mechanism on the hose reel assembly between the fixed base and the pivotal hose reel for locking the hose reel in the first adjusted position thereof, wherein the positive locking mechanism comprises:

(i) slots in the fixed base and the hose reel which slots overlie and align with one another when the hose reel is in the first adjusted position thereof; and (ii) a pivotal latch carried on the fixed base with the pivotal latch having a downwardly facing U-shaped section that fits down over a lip on the hose reel when the hose reel is in the first adjusted position thereof, one side of the U-shaped section of the latch forming an elongated locking finger that fits down through the aligned slots in the fixed base and the hose reel to positively lock the fixed base and hose reel together in the first adjusted position thereof.

13. The sprayer of claim 12, wherein the one side of the frame carrying the hose reel assembly is a lateral side of the frame.

14. A sprayer for applying a liquid spray solution to a ground or turf surface, which comprises:

(a) a self-propelled frame having a plurality of ground engaging wheels for supporting the frame for movement over the ground or turf surface, the frame further having an operator's compartment thereon for carrying an operator, a traction drive system including a manual shift transmission for powering a plurality of the ground engaging wheels on the frame, a service brake system having at least one service brake for at least one of the ground engaging wheels to slow and stop the movement of the frame, and clutch, brake and accelerator pedals for use by the operator in controlling the traction drive system and the service brake system;

(b) a tank carried by the frame for holding the liquid spray solution;

(c) a spray system carried by the frame for withdrawing the liquid spray solution from the tank and for spraying the liquid spray solution downwardly onto the ground or turf surface; and (d) a hill assist system to allow the operator to reestablish forward motion up a hill from a standing stop of the frame on the hill, wherein the hill assist system comprises:

(i) a sensor in the service brake system that changes state when a braking effort in the service brake system reaches a predetermined threshold level;

(ii) a controller operatively connected to the service brake system sensor, operatively connected to the service brake system, and operatively connected to sensors indicating whether or not the clutch or brake pedals are in home positions comprising non-depressed states of the pedals, wherein the controller upon receiving a signal from the service brake system sensor that the threshold level of braking effort has been reached locks in the braking effort to at least one service brake and maintains the locked in braking effort to the at least one service brake for as long as the clutch and brake pedals remain out of their home positions, and wherein the controller upon detecting that the brake pedal has been returned to its home position while the clutch pedal remains out of its home position continues to hold the locked in braking effort for a predetermined hold time to allow the operator to shift his or her foot from the brake pedal to the accelerator pedal to reestablish forward motion up the hill from the standing stop, the controller having a timer that counts down through the hold time and then releases at the expiration of the hold time the locked in braking effort to the at least one service brake.

15. The sprayer of claim 14, wherein the service brake system is a fluid operated system, the service brake system sensor is a pressure sensor detecting a pressure of the fluid in the service brake system, and the predetermined threshold level of braking effort is detected when the pressure sensor senses that fluid pressure in the service brake system exceeds a predetermined threshold level, and wherein the controller locks in the braking effort by locking in the fluid pressure to the at least one service brake through the operation of a valve in the service brake system.

16. A sprayer for applying a liquid spray solution to a ground or turf surface, which comprises:

(a) a frame that is movable over the ground or turf surface;

(b) a tank carried by the frame for holding the liquid spray solution;

(c) a spray system carried by the frame for withdrawing the liquid spray solution from the tank and for spraying the liquid spray solution downwardly onto the ground or turf surface through a plurality of downwardly facing spray nozzles;

(d) an agitation system carried by the frame for agitating the liquid spray solution within the tank through a plurality of inwardly facing agitation nozzles that are distributed on the tank at spaced locations; and (e) a master spray valve in the spray system which is normally open to permit flow of the liquid spray solution withdrawn from the tank by a pump to flow through the spray nozzles in the spray system with a portion of such pump flow being diverted prior to going to the master spray valve to an agitation valve in the agitation system when the agitation valve is in an open condition, wherein the master spray valve is operatively connected to a master spray switch to allow the master spray valve to be selectively shut off by the operator to stop the pump flow passing through the master spray valve from reaching the spray system with at least a portion of the stopped pump flow being added to the flow through the agitation valve to boost the effectiveness of the agitation system.

17. The sprayer of claim 16, wherein the master spray valve contains a bypass for splitting the stopped flow into a first portion that passes through the agitation valve and a second portion that returns to the tank through a return line that is separate from the agitation system.

18. The sprayer of claim 17, wherein the bypass is adjustable to allow the operator to selectively change how much of the stopped flow is split into the first portion and how much into the second portion.

* * * * *